United States Patent
Jones et al.

(10) Patent No.: US 6,579,365 B1
(45) Date of Patent: Jun. 17, 2003

(54) APPARATUS FOR COATING TABLETS

(75) Inventors: David M. Jones, Ramsey, NJ (US); Richard Andrew Smith, Goshen, NY (US); John Patrick Kennedy, Winchester, KY (US); Frank Maurer, Inzlingen (DE); Matthias Georg Tondar, Hausen (DE); Bernhard Luy, Freiburg (DE); Markus J. Baettig, Sissach (CH)

(73) Assignee: Glatt Air Techniques, Inc., Ramsey, NJ (US)

( * ) Notice: Subject to any disclaimer, the term of this patent is extended or adjusted under 35 U.S.C. 154(b) by 15 days.

(21) Appl. No.: 09/715,855

(22) Filed: Nov. 17, 2000

Related U.S. Application Data

(60) Provisional application No. 60/166,799, filed on Nov. 22, 1999.

(51) Int. Cl.$^7$ .............................. B05C 5/00; B05D 1/00
(52) U.S. Cl. ................................. 118/303; 118/DIG. 5
(58) Field of Search ......................... 118/303, DIG. 5; 427/185, 213; 239/424, 424.5

(56) References Cited

U.S. PATENT DOCUMENTS

| | | | |
|---|---|---|---|
| 3,386,182 A | | 6/1968 | Lippert |
| 3,992,558 A | * | 11/1976 | Smith-Johannsen et al. ..... 427/213 |
| 5,211,896 A | * | 5/1993 | Ward et al. ................. 264/126 |
| 5,437,889 A | * | 8/1995 | Jones ......................... 427/185 |

FOREIGN PATENT DOCUMENTS

| | | | | |
|---|---|---|---|---|
| EP | 0172530 A2 | 1/1986 | ............. | B01J/8/38 |
| EP | 0570546 B1 | 11/1993 | | |
| JP | 11033386 A | 2/1999 | ............. | B01J/2/16 |
| WO | WO93/08923 | 5/1993 | | |

* cited by examiner

Primary Examiner—Richard Crispino
Assistant Examiner—Yewebdar T Tadesse
(74) Attorney, Agent, or Firm—Darby & Darby

(57) ABSTRACT

A fluidized bed apparatus for applying a coating liquid onto the surface of particles includes a vertically disposed cylindrical product container having a peripheral wall, at least one cylindrical partition defining a centrally located up bed region and a peripherally located down bed region. The product container further includes an upper end connected to an expansion chamber and a lower end including an orifice plate having a plurality of openings for passage of fluidized air or gas. A nozzle is centrally located through the orifice plate and is adapted to generate a spray of coating liquid upwardly into the up bed. Particles located within the product container circulate upwardly through the partition and the coating liquid spray, between the up bed and the down bed. A plurality of inwardly directed discharge jets are positioned along the periphery of the product container and generally adjacent to the orifice plate. A source of pressurized air or gas is connected to the plurality of discharge jets and provide a radially inwardly directed flow of air or gas through the particles of the down bed so that the particles located adjacent to the peripheral wall of the product container are displaced radially inwardly along the orifice plate towards the nozzle and the up bed.

28 Claims, 11 Drawing Sheets

US 6,579,365 B1

APPARATUS FOR COATING TABLETS

This patent application claims priority of U.S. Provisional Patent Application, Ser. No.: 60/166,799, filed Nov. 22, 1999, which is incorporated herewith in its entirety.

BACKGROUND OF THE INVENTION

A. Field of the Invention

The present invention generally relates to coating machines and, in particular, to fluid-bed coating machines used for the coating of tablets.

B. Description of the Prior Art

Tablets are formed by pressing pharmaceutically active drugs, filler and binding agents together. Once formed, it may be necessary, or desirable to provide the tablet with a coating which will:

1. prevent any portion of the drug from being released, such as in the form of dust;
2. mask any unpleasant odor or taste of the active drug, or any filler or binder used;
3. facilitate swallowing by providing a smoother and less absorbent outer layer;
4. protect the contents of the tablet from pre-mature digestion by providing a coating which is resistant to gastric fluids;
5. control the rate of absorption of the drug by the small intestine; and
6. improve the appearance of the tablet and provide a printable surface.

The tablets are generally coated using machines which spray a coating material, such as hydroxypropylmethylcellulose onto the surfaces of the tablets while the tablets are in motion within a product container. Two common types of machines tumble tablets within a horizontally rotatable drum during the spraying process, while another type of tablet coating machine uses a vertical flow of air to circulate tablets past a vertically disposed spray nozzle. The prior art coating machines are described below:

1. Dragee Kettle

For most applications, the exact thickness of the coated layer is not critical and many different types of coating machines may be used to apply a crude, yet effective coating to the tablet. An older once popular type of coating machine is called a dragee kettle and examples of these machines are disclosed in U.S. Pat. Nos. 3,831,262 and 5,334,244. This machine includes a large drum-like vessel which is typically rotated about a horizontal axis. The vessel includes a coating chamber which is partially filled with tablets to be coated so that as the vessel rotates, the tablets roll and tumble along the inside wall of the coating chamber. During this tumbling motion, coating materials in the form of aqueous or organic suspensions of liquids are sprayed through nozzles and into contact with the rolling tablets within the coating chamber. During the coating process, a current of temperature-controlled air circulates in the coating chamber of the dragee kettle, which helps evaporate the suspension agent of the coating material so that the coating material effectively dries and adheres to the tablets.

One problem with the dragee kettle coating machine is that typically the tablets are not the only surfaces coated within the coating chamber. Even when a carefully controlled spraying schedule is followed (such as spraying at very short intervals while the dragee kettle rotates), much of the sprayed coating material still ends up on the inside wall of the coating chamber, as well as throughout the evaporation/venting ducting. This over-spraying creates numerous contamination and cleaning problems, and further increases the cost of the coating since much of the coating material is lost during the coating process.

The above-described dragee kettle type coating machine is limited to coating tablets which do not require much precision in the thickness of the coated layer because the thickness of the coating of the tablets will vary in the same batch. This process may be used to coat many different types of pharmaceuticals, vitamins, and even candy, as long as uniform coating distribution and thickness are not required.

2. Perforated Pan

The next generation of tablet coating machines after the dragee kettle is called a perforated pan tablet coating machine. This machine has improved the tablet coating process and is the most common type of tablet coating machine in use today. The perforated pan machine includes a rotatable perforated drum which rotates about a horizontal axis within a housing, and further includes a plurality of nozzles positioned within the drum. The nozzles create a spray of coating material within the drum so that any tablets located within the drum will tumble about into and out of the spray pattern and, over a period of time, will accumulate a coating on their surface. An important improvement of the perforated pan coating machine over the dragee kettle is that the perforated pan machine allows air directed through the housing (using appropriate ducting) to pass through the perorated drum and quickly reach the tablets tumbling therein. The perforations of the drum effectively expose the tumbling tablets to the current of air, resulting in more uniform distribution of drying air for each tablet. The drum further includes solid baffles which are used to enhance mixing of the tablet bed in an effort to improve the distribution of the material being sprayed onto the tablets.

3. Fluidized Bed Coating Machines

Another type of particle-coating apparatus is called a fluidized bed coating machine (also known as a Wurster machine, after inventor Dale Wurster). Several examples of the Wurster coating machine are disclosed in U.S. Pat. Nos. 3,196,827, 3,110,626, 3,880,116, 4,330,502, 4,535,006 and 5,236,503.

The Wurster coating machine is typically used to layer, coat or encapsulate lightweight powders, particles, granules or pellets of solid materials, including pharmaceutical drugs. Often, coatings are applied to modify the release of the substrate (protective barrier, taste masking, enteric coating, delayed release or sustained release). A predetermined quantity of these coated particles are usually packaged within an edible gelatin capsule or compressed into a tablet. The distribution uniformity of the applied substance may not be critical because the capsule or tablet contains multiple units and the average coating thickness of all of the pellets within the capsule dictate the average release properties and performance of the overall dosage form.

As described below, the Wurster machine generates an upward stream of air or other gases such as nitrogen to circulate a substrate (particles, pellets, powders, etc.) through a vertical spray of coating liquid within a product container. As the substrate cycles through the spray, a minute amount of coating material is deposited on its surface. The number of cycles the substrate completes determines the thickness of the final coating layer.

The conventional Wurster machine works well when the particles are fine and lightweight (such as grains of powder). However, due to flow-related problems inherent in the design, the conventional Wurster machine fails to provide a uniform distribution of coating on heavier tablets because the heavier tablets do not uniformly cycle through the machine. The Wurster-coated tablets cannot be used for applications which require uniform, predictable and consistent distribution coatings on all tablets within a particular batch.

Certain types of pharmaceutical controlled-released tablets require high-precision coatings because the thickness of the coating governs the time of release and the release rate of the active ingredient of the tablet and thereby directly influences the effectiveness of the medication. The conventional Wurster machine is incapable of providing a high-precision coating on tablets, in part due to the following flow-related problems, each of which adversely effects the precision of the coating of each tablet or particle in the batch.

The conventional Wurster machine also creates undesirable turbulence and introduces high shear forces to the substrate as it cycles through the machine. The fine and lightweight substrates typically used with conventional Wurster machines are not adversely affected by the violent traumatic forces they must endure during each cycle. However, when a conventional Wurster machine is used to coat heavier tablets, the high shear forces generated during each coating cycle are capable of damaging the tablets and the resulting attrition rate of the tablets is unacceptable.

The heavier tablets are also more difficult to introduce into the high velocity airstream of the Wurster machine, usually causing some of the tablets to accelerate directly into hard structures within the machine, such as a nozzle assembly. The impact can easily shatter or otherwise damage the tablets.

Once a substrate is processed using the Wurster machine, the substrate must be removed from the product container. This is conventionally accomplished through a pivotal bottom door which, when opened, allows the coated substrate to simply fall by gravity into an awaiting and suitable container. Although this emptying process is effective, the process exposes both the substrate and the interior of the product container to the environment. Not only does this exposure introduce undesirable contamination to the product container, it also subjects the operators of the machine unnecessarily to potentially hazardous materials. To this end, it would be beneficial to remove the coated substrate from the coating machine using a more controlled and predictable process without undue complexity and without affecting the machine's operation.

Another problem with Wurster machines is that they are relatively difficult to clean. The cleaning procedure typically requires the opening of the lower end of the product container and the application of an appropriate cleaning fluid. Some coating machines have spray nozzles within the coating machine to initially wash out any residual material deposited along the interior surfaces of the machine after the coating process. The cleaning fluid from these nozzles washes the interior surfaces of the machine and typically drains through the open lower end. Sometimes, however, the material being processed within the product container comprises a drug or other material which may be hazardous if accidentally inhaled, swallowed or even touched by personnel assigned to operate and clean the coating machine. It would therefore be beneficial to ensure that a maximum amount of this potentially hazardous residue is washed from the expansion chamber and the product container while isolating the contaminated waste from the surrounding environment. (i.e., without having to opening the machine).

OBJECTS OF THE INVENTION

It is an object of the present invention to provide a fluidized-bed type coating machine which overcomes the deficiencies of the prior art.

It is another object of the present invention to provide a Wurster-type coating machine which encourages even and predictable flow of tablets located in the down-bed.

It is another object of the present invention to provide a Wurster-type particle-coating machine which encourages tablets to flow radially inwardly along a distribution plate between the down-bed and an up-bed.

It is another object of the invention to provide a Wurster-type particle-coating machine which includes a central nozzle assembly located at the distribution plate for discharging a spray of coating liquid and which further includes structure to redirect tablets from the down-bed to the up-bed without impacting the central nozzle assembly.

It is another object of the invention to provide a Wurster-type particle-coating machine which is particularly suited to accurately coat heavier particles, such as tablets.

It is another object of the present invention to provide a Wurster-type particle-coating machine which includes a partition which is shaped to provide an atraumatic transition of the tablets moving from the down-bed into the up-bed.

It is another object of the present invention to provide a Wurster-type particle-coating machine which cycles the tablets within the machine between the down-bed and the up-bed in a smooth, efficient, and consistent manner so that the resulting coating distribution of each tablet is consistent and predictable and tablet-attrition is minimized.

It is another object of the present invention to provide a Wurster-type particle-coating machine which permits discharge of the substrate (particles or tablets) through an opening at the center of the orifice plate at the base of the insert when multiple partitions are used.

It is another object of the present invention to provide a Wurster-type particle coating machine which is easy to operate during the coating process and facilitates cleaning without disassembly of the Wurster insert.

SUMMARY OF THE INVENTION

The foregoing objects of the invention are met through various improvements to a Wurster-type fluidized bed apparatus for applying a coating liquid onto the surface of particles. The coating liquid is generally comprised of substances in a solution, suspension or dispersion in water or organic solvent (in some cases a molten liquid may be used). The apparatus includes a vertically disposed cylindrical or slightly conical product container having a peripheral wall, at least one cylindrical partition defining a centrally located up bed region and a peripherally located down bed region. The product container further includes an upper end connected to an expansion chamber and a lower end including an orifice plate having a plurality of openings for passage of fluidized air. A nozzle is centrally located through the orifice plate and is adapted to generate a spray of coating liquid upwardly into the up bed. Particles located within the product container circulate upwardly through the partition and the coating liquid spray, between the up bed and the down bed.

A first feature of the invention comprises a plurality of inwardly directed discharge jets positioned along the periphery of the cylindrical product container and generally adjacent to the orifice plate. A source of compressed air or other inert gases such as nitrogen is connected to the plurality of discharge jets. The flow of compressed air through the jets provides a radially inwardly directed airstream through the particles of the down bed so that the particles located adjacent to the peripheral wall of the product container are displaced radially inwardly along the orifice plate towards the nozzle and the up bed.

A second feature of the invention comprises a partition for use in a Wurster-type coating machine. This partition includes an outer wall surface and an outwardly directed, flared lower end defining a lower rim. The partition further includes an inwardly and upwardly directed ramp surface extending between the lower rim and the up bed. The partition encourages particles located within the down bed adjacent to the outer wall surface to move outwardly away from the up bed until reaching the lower rim, at which point the particles are atraumatically and gradually directed inwardly and upwardly along the inwardly and upwardly directed ramp surface into the up bed to continue the coating process.

A third feature of the invention comprises a nozzle ramp which is placed around the nozzle. The nozzle ramp is generally cusp shaped and includes a nozzle-ramp surface. The nozzle ramp is centrally positioned around the nozzle and is directed upwardly towards the partition so that the nozzle-ramp surface directs particles moving generally horizontally across the orifice plate from the down bed upwardly into the partition and the up bed. The nozzle ramp may further include air passages for passing fluidized air upwardly to the nozzle-ramp surface. The air flow through these perforations provides a cushion of air at the surface of the nozzle ramp which minimizes the impact of tablets against this structure. The purpose of the perforated nozzle ramp is to atraumatically guide the horizontally flowing tablets vertically and upwardly into the up bed inside the partition.

DETAILED DESCRIPTION OF THE FEATURES OF THE INVENTION

By way of background and introduction, the present invention provides improvements relating to tablet flow and handling during the coating process of an otherwise conventional Wurster-type bottom-spray particle coating machine (hereinafter referred to as "Wurster machine"). To better understand and appreciate the improvements of the present invention, a detailed description of the structure and operation of a conventional Wurster machine is first provided.

A. Description of a Conventional Wurster Machine

Figure 1:
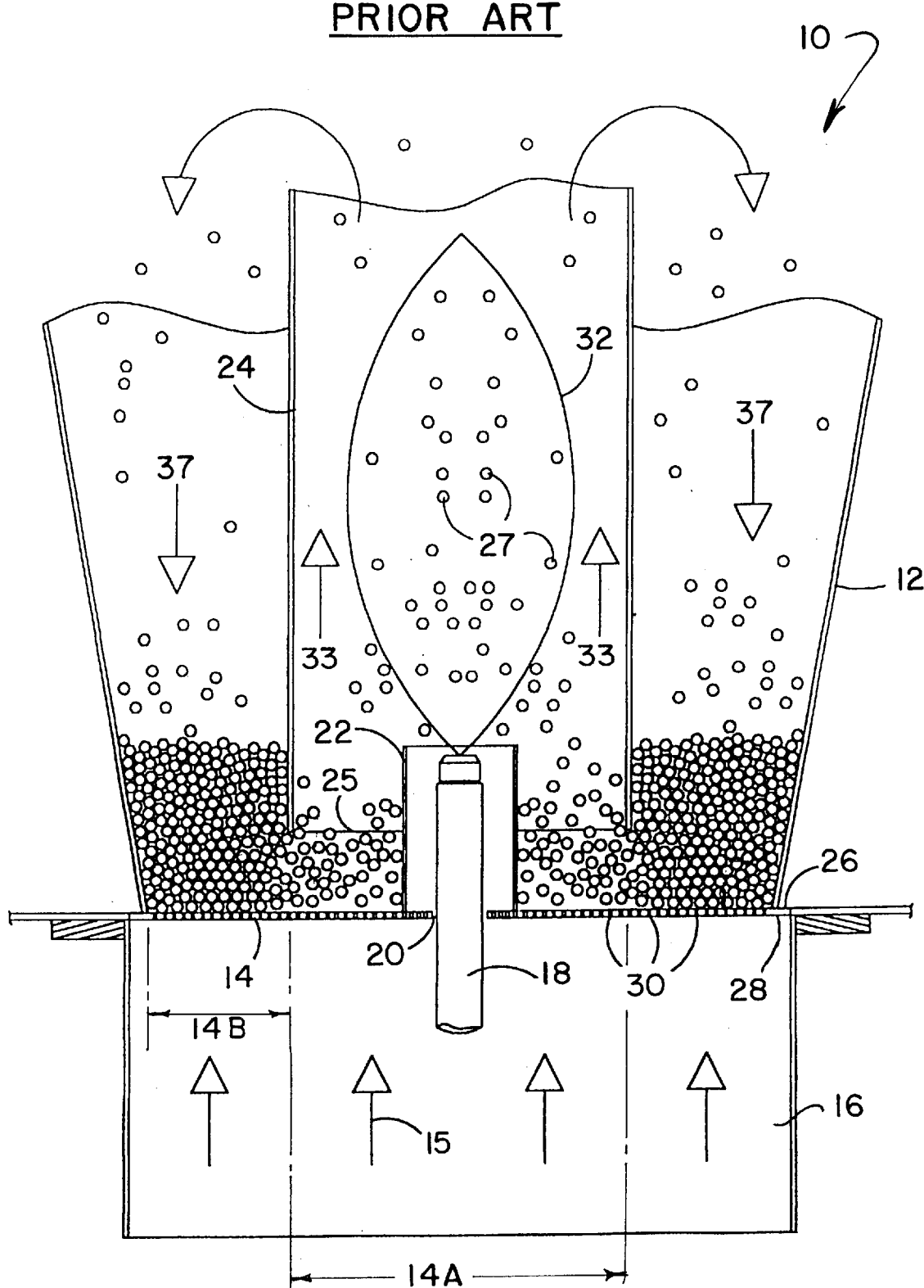
FIG. 1 is a sectional side view schematic (labeled PRIOR ART) of a prior art Wurster-type bottom spray particle-coating machine showing a product container, a partition, a nozzle, a down-bed, an up-bed, a nozzle sleeve, and a plurality of tablets or pills (represented by spheres) being coated as they circulate through the machine.
Figure 2:
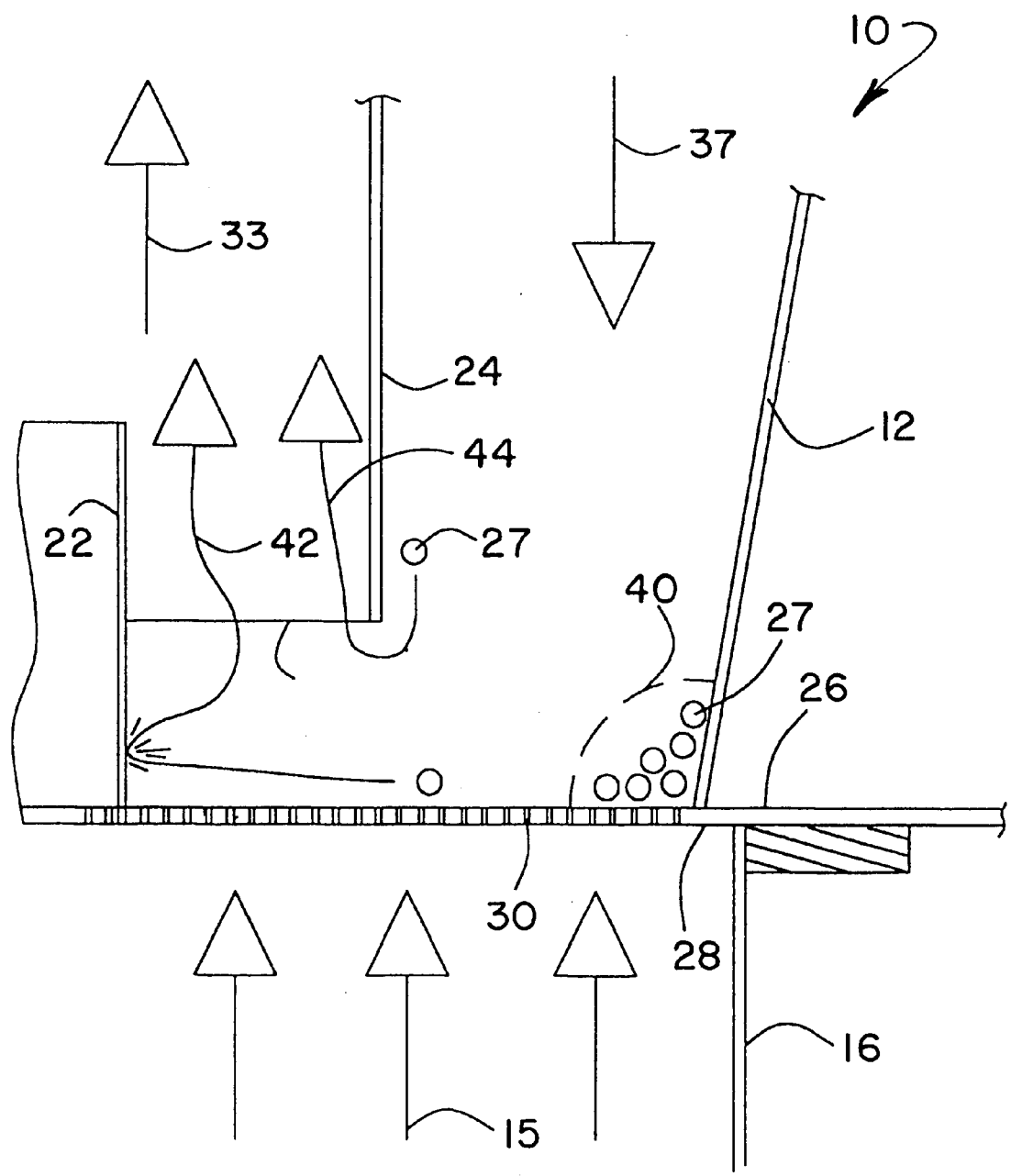
FIG. 2 is an enlarged sectional view (labeled PRIOR ART) of a portion of the prior art Wurster-type coating machine of FIG. 1 (shown without the numerous particles, for clarity) including particle-flow arrows representing the flow of particles during their transition from the down-bed into the up-bed air-stream, and further including a dashed line representing a "dead-zone" within the product container.

Referring to FIGS. 1 and 2 (labeled PRIOR ART), a conventional Wurster machine is shown, including a generally conical product container 12, an orifice plate 14, a lower plenum 16, a central nozzle 18 projecting upwardly through a central opening 20 located within orifice plate 14, a nozzle sleeve 22, and a cylindrical partition 24. The product container 12 may be cylindrical or conical in shape and is mounted to an upper surface 26 of orifice plate 14, while the lower plenum 16 connects with a lower surface 28 of orifice plate 14. The upper end of the product container 12 is connected to an expansion chamber (not shown).

Figure 16:
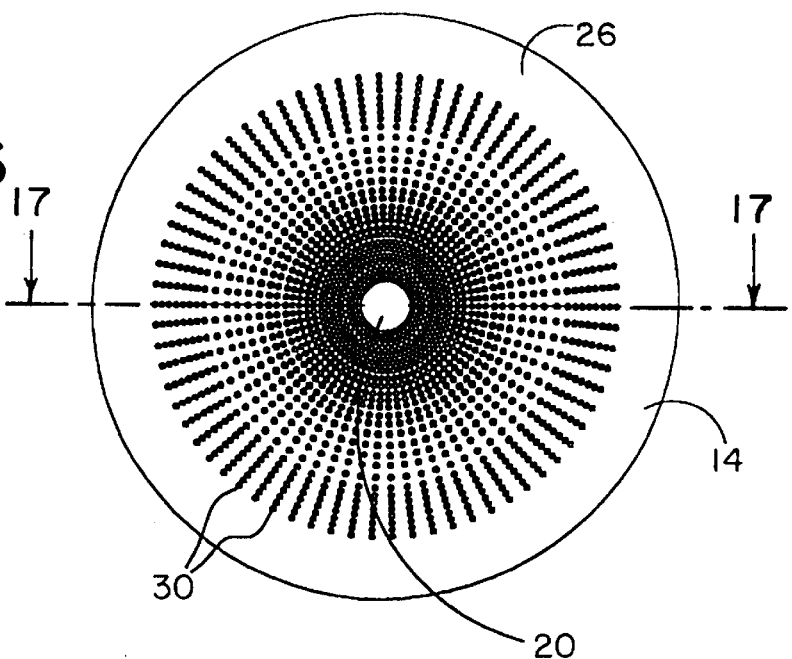
FIG. 16 is a plan view of a conventional orifice plate.
Figure 17:
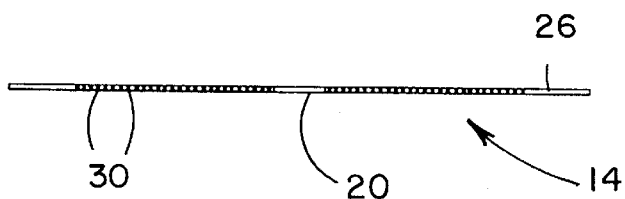
FIG. 17 is a sectional side view of the conventional orifice plate of FIG. 16, taken along the line 17—17 of FIG. 16.

As shown in FIGS. 16 and 17, orifice plate 14 includes a plurality of orifices 30 which are arranged in such a manner as to allow air to flow (represented in FIGS. 1 and 2 by arrows 15) from the lower plenum 16 through the orifices 30 and into the product container 12, to create a fluidized bed, as is described in greater detail below. Orifice plate 14 typically includes two sections of relative porosity concentrically positioned around the central opening 20; an up bed section 14A (also referred to as an "up bed plate"), and a down bed section 14B (also referred to as a "down bed plate"). Air flow from the lower plenum 16 will behave differently in the up bed plate and the down bed plate. The air flow generated by a remote blower unit (not shown) is restricted in a controlled and predictable manner so that a desired fluidity of the solid particles located within the product container is maintained. The up bed section 14A of the orifice plate (located under the partition 24 and adjacent to the nozzle 18) includes a large number of orifices 30 which allow a high volume of air from the lower plenum 16 to pass through the orifice plate 14 and up through the partition 24 at a relatively high velocity. This upward flow of high velocity air is called the up bed (represented by arrows 33 in FIGS. 1 and 2) and is used to pneumatically transport the substrate vertically past the spray nozzle during each cycle.

The ring-shaped region outside of the partition 24 within the product container 12 is referred to as the down bed (represented by arrows 37 in FIGS. 1 and 2). The down bed section 14B of the orifice plate 14 has a porosity (number, diameter and distribution of orifices 30) which allows sufficient air flow to penetrate the substrate from the lower plenum 16 and to maintain the substrate located in the down bed in near-weightless suspension. This influx of air causes the particles 27 to behave somewhat like a fluid and travel rapidly and freely downward in the down bed 37 and subsequently be drawn horizontally through the transition gap and redirected upwardly into the up bed. The amount of air flow required to produce the near-weightless suspension of the substrate depends on the size and shape of the particular substrate. In general, tablets require significantly more air to produce this condition than pellets or fine particles and the orifice plate 14 must be designed accordingly.

The central nozzle 18 of the prior art Wurster machine 10 in FIG. 1 is mounted through the central opening 20 of the orifice plate 14 so that its discharge outlet is directed upwardly into the partition 24 and product container 12. The nozzle 18 ejects a highly atomized spray of coating liquid into the partition, creating a "coating zone" 32 which is usually shaped as a narrow volumetric ellipse. The exact shape of the coating zone may be controlled according to the size of the substrate being coated and the pattern density in the partition. The atomized spray is discharged from the nozzle at about 300 meters per second.

Centrally and vertically mounted within the product container is the cylindrical partition 24 whose diameter is about half the diameter of the product container 12 (as measured at the base of the product container). The cylindrical partition 24 is positioned within the product container 12 adjacent to and above the central nozzle 18 so that the spray pattern discharged from the nozzle 18 extends into the partition 24. As is understood by those skilled in the art, the partition 24 is used to help direct particles 27 located within the product container 12 as they circulate throughout the Wurster machine, and further to protect the integrity of the spray pattern 32. The partition 24 also helps separate particles 27 moving upwardly in a centrally located up bed 33 through the coating zone 32 from particles 27 that are falling back towards the orifice plate 14 in a peripherally oriented down bed 37 with respect to the product container 12.

The partition 24 includes a lower edge or rim 25 and is positioned within the product container 12 so that the lower rim 25 is located a predetermined distance from the upper surface 26 of the orifice plate 14. The space (or "transition gap") that is created between the lower rim 25 of the partition 24 and the upper surface 26 of the orifice plate 14 forms a "transition zone" where particles 27 located in the peripheral down bed 37 are radially-inwardly drawn through a differential in pressure back into the central up-bed 33.

Conventional Wurster machines do not shield the relatively hard nozzle assembly 18 and will typically result in particle attrition and breakage as the particles impact the nozzle assembly 18 as they accelerate from the down bed 37 to the up bed 33.

One improvement over the conventional Wurster machine regarding the problem of particle attrition and breakage due to an exposed nozzle assembly 18 is disclosed in commonly owned U.S. Pat. No. 5,236,503. This patent discloses a protective nozzle sleeve 22 which is a tube positioned around the nozzle assembly 18. The nozzle sleeve 22 disclosed in U.S. Pat. No. 5,236,503 (and shown in FIG. 1 of the present patent application) prevents particles 27 from entering the spray pattern until it is more fully developed, thereby increasing productivity. Furthermore, it keeps the substrate from encountering the extremely high compressed air velocity at the tip of the spray nozzle thereby reducing particle attrition and breakage. Unfortunately, some of the particles accelerating into the up bed 33 in the prior art Wurster machine (with the improved protective nozzle sleeve 22) still impact the nozzle sleeve 22, resulting in a measurable attrition rate. Such impact damage to the particles 27 will only increase as the mass of the particles increases, such as when relatively heavy tablets are cycled through the coating machine.

Another problem with the prior art nozzle sleeve 22, as shown in FIG. 1 of the present patent application and also disclosed in U.S Pat. No. 5,236,503 is that the sleeve itself is prone to trapping particles 27 at the completion of the process, when fluidization air flow is stopped. Once trapped within the hollow nozzle sleeve 22, the particles 27 will no longer circulate within the machine and may further interfere with the air flow around the nozzle, causing its spray pattern to be altered and resulting in undesirable agglomeration of the particles. These trapped particles must be manually removed prior to loading a subsequent batch.

B. Conventional Wurster Operation

In operation of the prior art Wurster machine shown in FIGS. 1 and 2, a supply of particles 27 that are to be coated are placed within the product container 12. The size of the particles 27 are typically between 100 and 2000 microns in diameter. The particular operating parameters (such as the specific size, permeability, and arrangement of the orifices 30 in orifice plate 14, and the height of the transition gap) of the Wurster machine will vary depending on the size and type of particles 27 being coated.

When the particles 27 are positioned within the product container 12, a flow of filtered air is drawn from an air handling unit (not shown), the product container itself, and an expansion chamber (not shown) using an appropriate blower fan (also not shown) creating a negative pressure within the expansion chamber and the product container 12. This negative pressure causes air (arrows 15) to be drawn upwardly through orifices 30 of orifice plate 14 from lower plenum 16. As the air is drawn into the product container 12 through orifices 30, it passes through both the up bed 33 and the down bed 37 (moving upwardly) penetrating and influencing the particles 27 located in the down bed 37, as shown in FIG. 1. The upward flow of air causes each particle 27 of the down bed 37 to effectively float or become suspended on a cushion of air as the air flow finds its way upward into the product container 12 to try to equilibrate the negative pressure in the expansion chamber. The "floating" particles 27 become "fluidized", behaving more like a fluid than a mass of solid particles. Air (arrows 15) from plenum 16 is also drawn into the product container 12 through opening 20 and into nozzle sleeve 22 and further up into partition 24 adding to the up bed air stream 33.

After the flow of air from the lower plenum 16 fluidizes the particles 27 within the product container 12, the central nozzle 18 is activated to discharge a controlled spray pattern 32 of coating liquid upwardly into partition 24, as shown in FIGS. 1 and 2. The spray liquid generally is comprised of a solution, suspension or dispersion in water or organic solvent (in some cases a molten liquid may be used) and is ejected upwardly from the nozzle 18 at a high velocity around 300 meters/second, depending on the particular type and size of particle being coated, the type of coating material used, and the desired coating characteristics.

As the particles 27 rise rapidly upward in the high-velocity up bed air stream 33 created by the nozzle 18, they contact micro-atomized droplets of the coating liquid and become coated before slowing down within the expansion chamber (not shown). As the particles 27 continue to rise in the partition 24 and into the expansion chamber, excess moisture from the applied coating liquid evaporates.

The high-velocity air stream spouting from the upper end of the partition 24 forces the particles 27 radially outwardly in the expansion chamber (as represented in FIG. 1 by arrows 35). Once away from the upstream lift provided by the up bed 33, the particles 27 are influenced by gravity and fall within the product container 12 in the down bed 37, eventually reaching the orifice plate 14.

The high volume and velocity of the airflow into and through the partition 24, combined with the high velocity of the air from the nozzle 18, generates a very strong negative pressure in the transition zone lying adjacent to the nozzle 18 and the orifice plate 14 relative to the measured pressure within down bed 37. This creates a pressure differential. The pressure differential draws the particles 27 that are located in the peripheral down bed 37 radially inwardly through the transition zone and into the up bed 33. The up bed again accelerates the particles 27 up into the partition 24 and through the coating zone 32.

The cycle is repeated for all particles 27 located within the product container 12, until a desired coating thickness is formed on all particles of the batch.

C. Problems with the Conventional Wurster

As discussed in the Background section of this specification, the above-described Wurster machine is generally effective at coating fine particles within the product container. The longer the particles are kept circulating through the spray of the coating liquid, the greater the thickness of the coating on each particle, and the greater the consistency between coated particles of the same batch. The Wurster machine, however, fails to provide an accurate and predictable distribution of coating on the particles as the particles increase in mass and size (such as when tablets or pills are cycled through the machine). The conventional Wurster machine includes three main particle-flow-related problems which are inherent in its design and are illustrated in FIG. 2 and described below.

A first flow-related problem of the Wurster machine relates to an uneven circulation flow of particles 27 located in the down bed 37 resulting in the creation of a peripheral "dead zone" 40 (shown in dashed lines in FIG. 2). During the coating process, the heavy tablets (or particles 27) within the down bed 37 exert pressure on the orifice plate 14, particularly along the peripheral wall of the product container 12. Owing in part to this "loading", a region of low-flow (and in some cases, no flow) is created along the outer perimeter of the product container 12 within an outer and lower section of the down bed 37. The dead zone 40 generally extends approximately 50 mm above the orifice plate 14 and about 50 mm out into the product container. The tablets (or particles 27) located within this peripheral dead zone 40 of the down bed 37 tend to slow down and even stop relative to tablets (or particles 27) located radially inwardly within the down bed 37. These slower moving tablets (or particles 27) in the dead zone 40 fail to circulate as often as the other tablets and will therefore have an adverse effect on the consistency of coating distribution between tablets within the same batch. During the coating process, the surface properties of the tablets change, and flow behavior in most instances worsens (the flow of tablets slows down). This decrease in tablet flow tends to increase the probability that a slow or dead zone will form along the perimeter of the base of the product container.

Again, referring to FIG. 2, a second flow-related problem of the prior art Wurster machine 10 relates to a misdirected flow of particles 27. As a pressure differential is created in the transition zone between the down bed 37 and the up bed 33 of the Wurster machine, some of the heavier particles 27 (e.g., tablets) lying close to the orifice plate 14 fail to divert upwardly into the airstream of the up bed 33 and actually impact against either nozzle 18, or nozzle sleeve 22 (if one is used). This impact path is represented by an arrow 42 in FIG. 2 and will invariably increase attrition and breakage of the tablets.

A third flow-related problem of the prior art Wurster machine 10 is that a percentage of tablets 27 located within the down bed and adjacent to the partition 24 are violently and traumatically pulled into the up-bed 33 by a pressure differential, resulting in tablet attrition and breakage. This traumatic flow path is represented by an arrow 44 in FIG. 2.

Another problem associated with the prior art Wurster machine becomes apparent after the coating process is complete and particles 27 must be removed from the product container 12. The conventional process includes hinging open the lower plenum 16 (and the orifice plate 14) from the lower portion of the product container 12 and literally dumping the coated particles 27 from the product container 12 into an awaiting container. Not only does this crude emptying procedure expose the immediate environment (including workers) to potentially hazardous materials (such as drug residue), it also exposes the freshly coated particles and the interior surfaces of the product container and orifice plate to possible contamination.

Also, the conventional Wurster machine is difficult to clean, usually requiring hinging open the lower plenum 16 (as described above) and spraying a cleaning solution throughout the product container and expansion chamber, allowing the waste cleaning fluid (which is contaminated and potentially hazardous) to pour from the machine through the open lower plenum 16. As during the above-described particle emptying procedure, this prior art cleaning process introduces potentially hazardous materials to the immediate environment which are difficult to handle and contain.

Finally, the prior art nozzle sleeve 22, described in commonly owned U.S. Pat. No. 5,236,503 fails to adequately prevent particles impacting its surface, and further is prone to accumulating and trapping particles at the completion of the coating process. U.S. Pat. No. 5,236,503 is hereby incorporated by reference into this specification.

D. Description of the Present Invention

Figure 3:
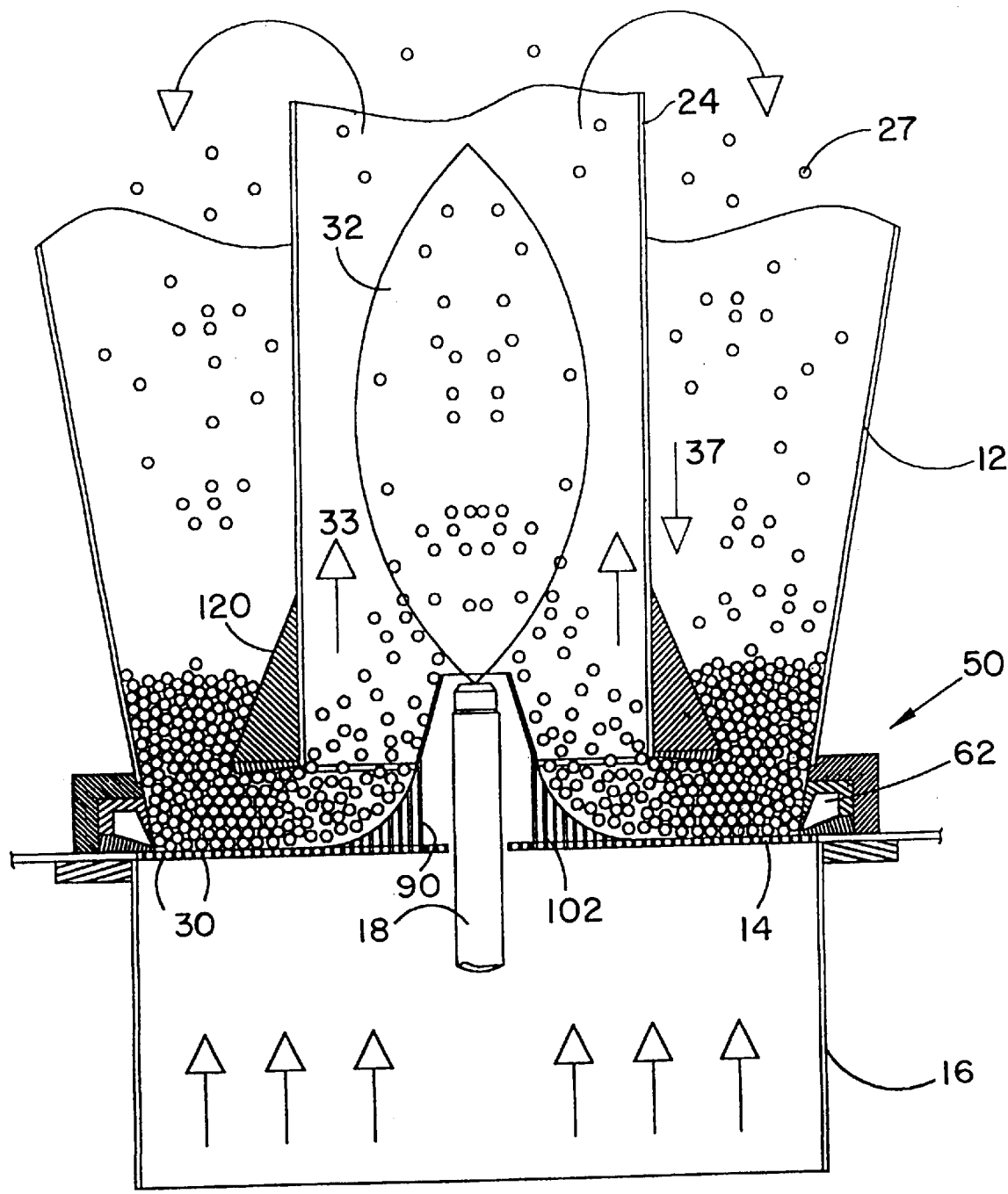
FIG. 3 is a sectional side view schematic of an improved Wurster-type bottom spray particle-coating machine showing a product container, a partition having a peripheral skirt, a nozzle, a down-bed, an up-bed, a nozzle sleeve, a truncated cusp-shaped nozzle-ramp, and a plurality of tablets or pills (represented by spheres) being coated as they circulate through the machine, according to the present invention.

Referring now to FIG. 3, a Wurster machine is disclosed including improved features according to the present invention. The improved features solve the above-discussed problems of the conventional Wurster machine so that the improved Wurster machine may be used to accurately and efficiently coat heavier particles 27, such as tablets and pills (hereinafter referred to as "tablets" 27).

1. Air-Injection Manifold

As discussed above in the background section of the specification, one problem inherent in the design of the conventional Wurster machine is the existence of dead zones, wherein tablets 27 become stagnant and cycle fewer times than other tablets in the same batch. According to a first feature of the invention, as shown in FIGS. 3, 4, 5, 7 and 8, an air-injection manifold 50 is provided around the lower end of the product container 12 adjacent to the orifice plate 14 and which overcomes the problems associated with the creation of dead zones in prior art coating machines.

Figure 4:
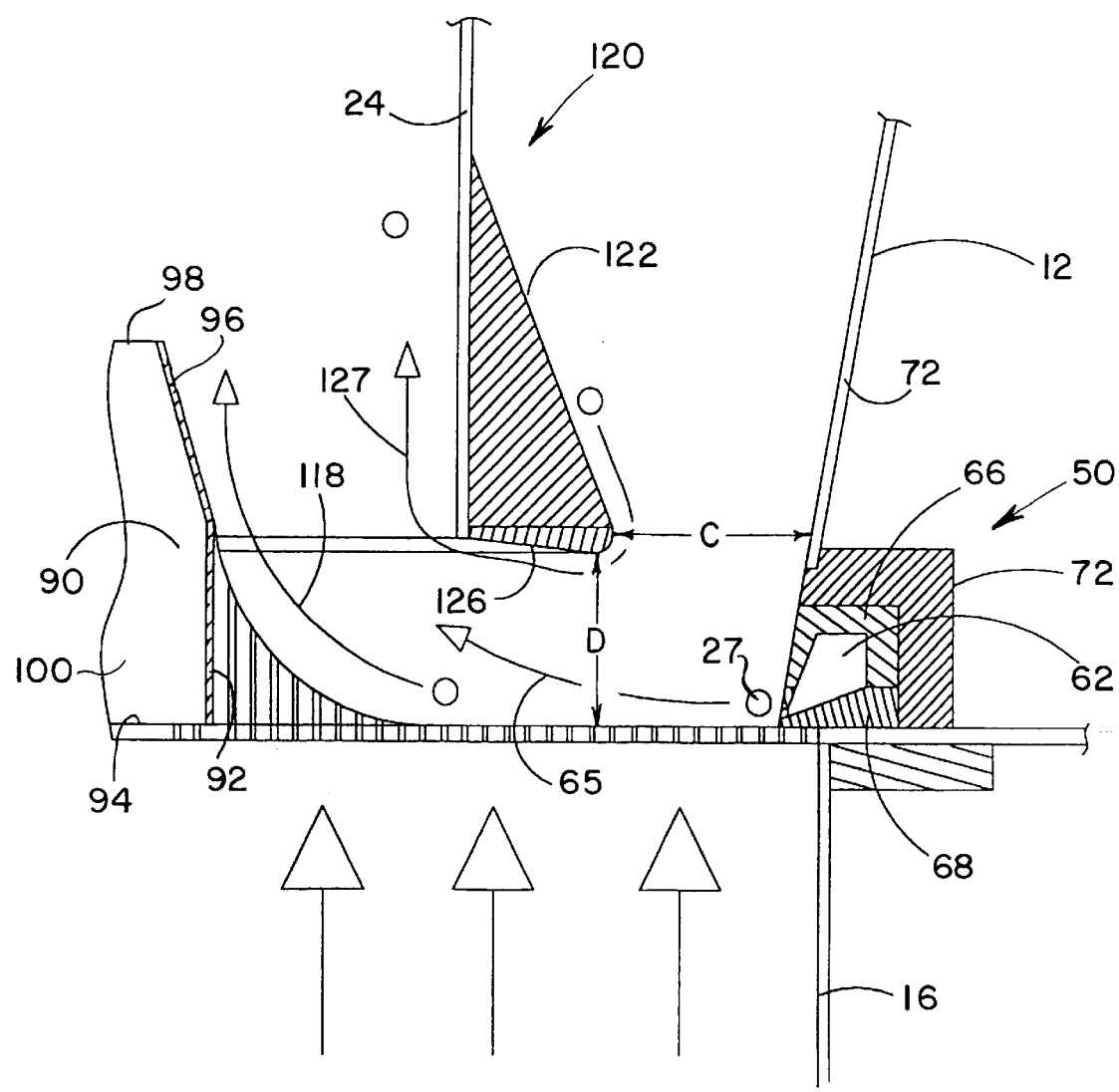
FIG. 4 is an enlarged sectional view of a portion of the improved Wurster-type coating machine of FIG. 3 (shown with only selected particles, for clarity) showing details of the peripheral skirt, the nozzle-ramp, the nozzle sleeve, and the peripheral air-injection system and further including particle-flow arrows representing the flow of the selected particles during their transition from the down-bed into the up-bed air-stream, according to the invention.
Figure 5:
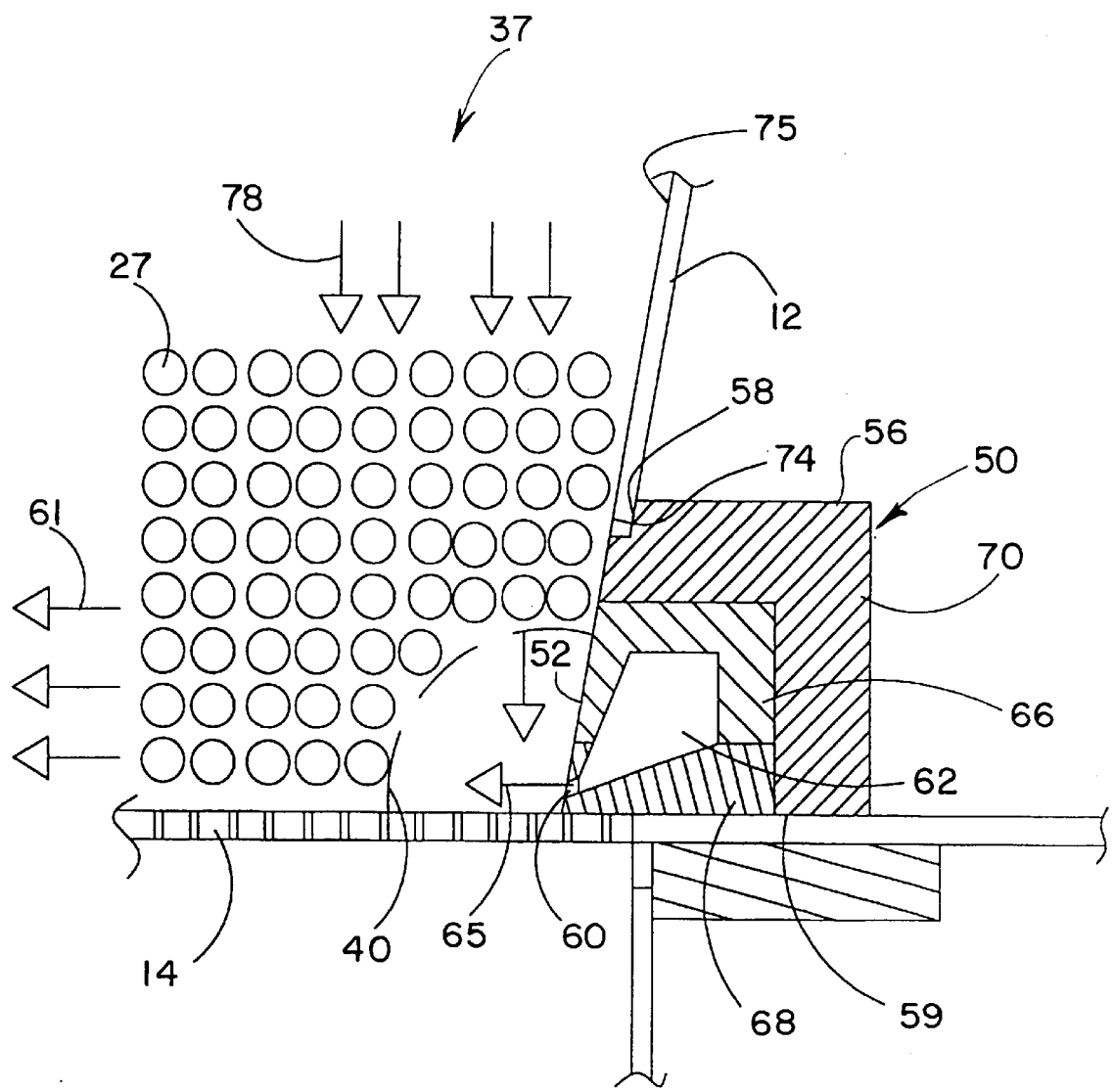
FIG. 5 is an enlarged sectional view of a portion of the improved Wurster-type coating machine of FIG. 3, showing details of a dead-zone (shown in dashed line), the peripheral air-injection system, and flow arrows, according to the present invention.
Figure 7:
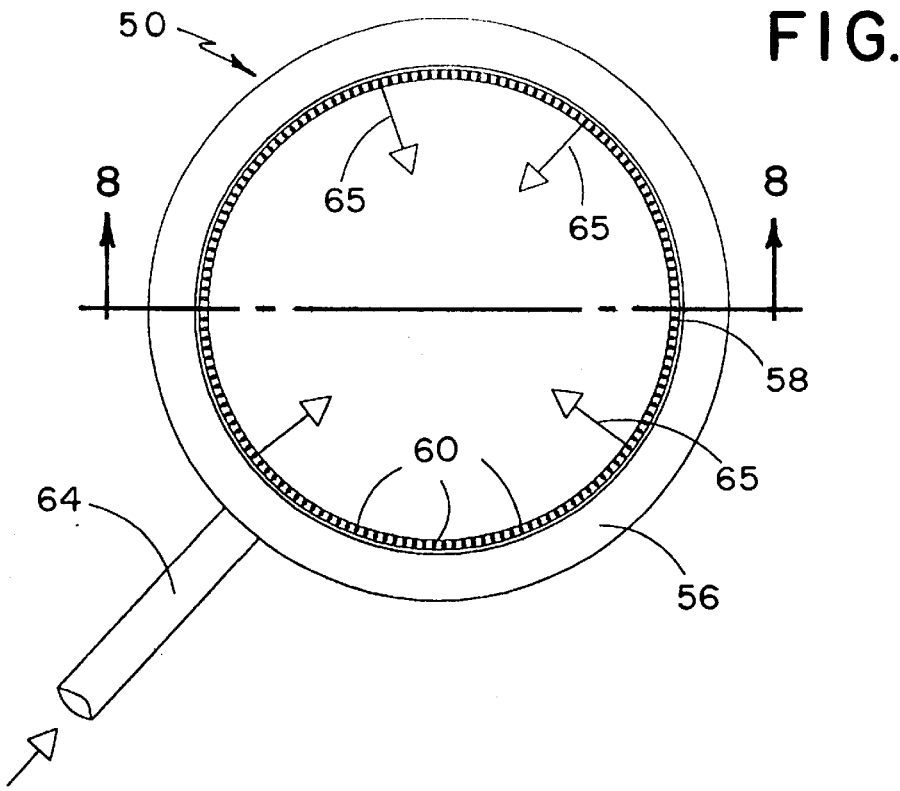
FIG. 7 is a plan view of the peripheral air-injection system showing an inlet conduit, a ring manifold assembly including a plurality of inwardly-directed discharge outlets, according to the invention.
Figure 8:
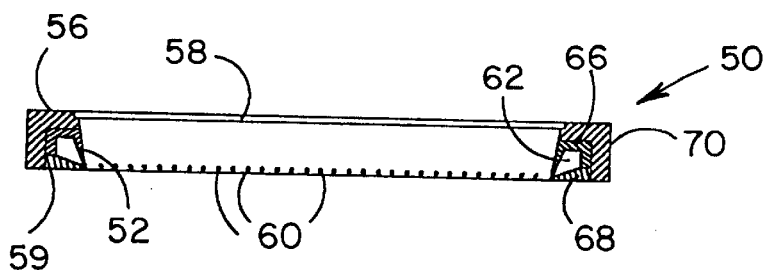
FIG. 8 is a sectional view of the peripheral air-injection system of FIG. 7, taken along the lines 8—8 of FIG. 7, according to the present invention.
Figure 9:
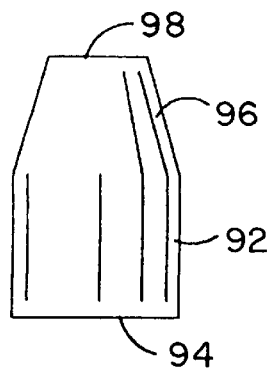
FIG. 9 is a side view of the nozzle sleeve, according to the invention.
Figure 10:
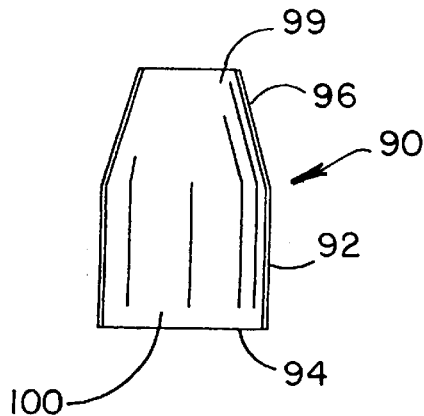
FIG. 10 is a cross-sectional side view of the nozzle sleeve of FIG. 9, according to the invention.

As shown in FIGS. 5, 7 and 8, ring manifold 50 is circular and includes an inner surface 52 having a lower edge 54, an upper surface 56 having a circumferential channel 58 located immediately adjacent to the inner surface 52, a bottom surface 59, and a plurality of openings 60 evenly spaced along the inner surface 52 immediately adjacent to the lower edge 54. Openings 60 are directed radially inwardly towards the center of the circular manifold 50. Each of the openings is in fluid communication with an internal circumferential conduit 62 which is shown in section in FIGS. 3, 4, 5, and 8. An inlet conduit 64 (FIG. 7) connects with the internal conduit 62 so that air supplied under pressure to inlet conduit 64 flows within conduit 62 and discharges evenly throughout the plurality of openings 60 around the inner surface 52. This discharge of air flow from openings 60 results in a radially directed flow of air (airflow from selected openings 60 is represented by arrows 65 in FIG. 7).

Since manifold 50 is intended to be used in a clean environment, it is preferably made as an assembly of parts which may be selectively disassembled to access and clean all surfaces. To this end, internal conduit 62 is preferably formed by fitting a conduit ring 66 and a bottom sealing ring 68 with an outer main ring 70, as shown in FIGS. 3, 4, and 8.

According to the invention, manifold 50 is positioned between a side wall 72 of product container 12 and orifice plate 14, as shown in FIGS. 3, 4, and 5, and is sized and shaped so that a lower end 74 of side wall 72 snugly fits within the circumferential channel 58 and forms a smooth transition between an inner surface 75 of side wall 72 and inner surface 52 of manifold 50. Inner surface 52 of ring manifold 50 preferably angularly aligns with the conical product container 12. Bottom surface 59 of manifold 50 is mounted to the upper surface 26 of orifice plate 14 so that the openings 60 of manifold 50 lie immediately adjacent upper surface 26 of orifice plate 14. With this arrangement, according to the invention, air (or any fluid, including cleaning liquids or rinse water) that is introduced under pressure into inlet conduit 64 will discharge through openings 60 in a radially inward direction across the upper surface 26 of orifice plate 14. As illustrated in FIG. 5, this inwardly directed blast of air 65 from manifold 50 effectively prevents the dead zone 40 from forming by forcing all tablets 27 located in this region to move horizontally towards the transition zone and nozzle 18 (as represented by arrows 61 in FIG. 5). Tablets 27 are not shown in dead zone 40 of FIG. 5 for clarity so that air flow arrow 65 can be seen and understood. According to the invention, manifold 50 keeps all of the heavy tablets moving evenly from down bed 37 to up bed 33 so that an otherwise conventional Wurster machine may be used to coat heavy tablets 27 without creating a peripheral dead zone 40 within the product container 12. Additionally, as discussed in greater detail below, the volume and velocity of the air from openings 60 may be adjusted to compensate for changing tablet surface flow properties during the application of coating material to the tablets. This manifold air adjustability is independent of the process air flow through the orifice plate in the up bed 33 and down bed 37 regions.

The effectiveness of introducing a radially directed blast of air from the periphery of the product container 12 along the upper surface 26 of the orifice plate 14 can be appreciated through the illustrations of FIGS. 4 and 5. Arrow 65 of FIG. 5 represents the force of the radially inwardly directed blast of air while arrow 78 represents the "loading" or force exerted by the tablets 27 located in the down bed 37 on orifice plate 14. The horizontal force 65 generated by the discharged air from openings 60 of manifold 50 move the lower tablets 27 of the down bed 37 radially inwardly as shown by arrow 61, to effectively make room for other tablets 27 of down bed 37 and to keep all of the tablets 27 moving in a smooth and consistent flow from down bed 37 to up bed 33.

Referring to FIG. 4, a representative tablet 27 moves on a radially inward path (arrow 65) in response to the radially inwardly directed flow of air discharged by openings 60 of manifold 50. The horizontal air injection flow created by manifold 50 cooperates with the conventional flow of air passing through openings 30 of orifice plate 14 to maintain fluidization of tablets 27.

The air pressure used to feed manifold 50 will vary depending on the size and shape of the tablets 27 being coated, their changing flow properties during a coating process, the size and shape of the particular product container 12, the particular configuration of the orifice plate 14, and other operational and structural parameters of the machine. The air pressure measured in one operational example was about 20 pounds per square inch (p.s.i.).

According to another aspect of the invention, the supplied air pressure may be controlled so that the velocity of the air discharged from openings 60 will vary at predetermined time periods during a coating procedure. Tablets 27 are typically provided with a lubricant on their surface which allows them to flow easily throughout the coating machine during the first few minutes of the coating process. As the coating is applied, however, the surface of each tablet 27 tends to become a bit tacky, resulting in a slower descent rate in the down bed 37. By controlling the radially directed air injection (independent of the flow of air through the orifice plate) over time, the flow resistance caused by the "tackiness" of tablets 27 in the down bed 37 can be accounted for and minimized, resulting in a consistent down bed (and up bed) behavior. For most instances, during the coating process, the air flow through outlets 60 of manifold 50 may be controlled to gradually increase in velocity and volume.

2. Nozzle Sleeve

Figure 6:
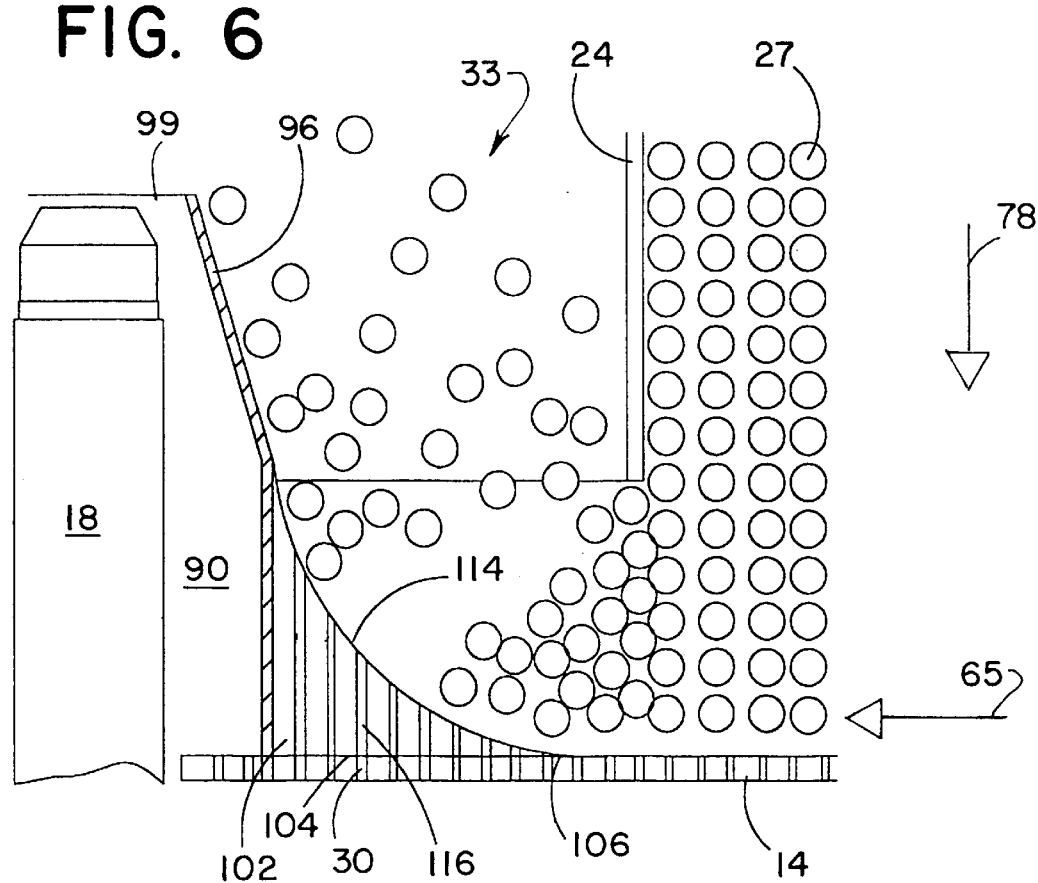
FIG. 6 is an enlarged section view of a portion of the improved Wurster-type coating machine of FIG. 3 showing details of the nozzle-ramp and nozzle sleeve (showing a conventional straight-edged partition), and including flow arrows, according to the present invention.

Referring to FIGS. 3, 4, 9, and 10, a nozzle sleeve 90 is shown according to a second feature of the present invention. Nozzle sleeve 90 is hollow and includes a generally cylindrical base portion 92, having a circular bottom edge 94, a truncated conical upper portion 96 having a circular upper edge 98 (defining an upper opening 99), and a central hollow passage 100. Nozzle sleeve 90 is sized and shaped to fit around nozzle 18 (see FIGS. 3 and 6). Passage 100 and the diameter of upper opening 99 may be sized with respect to the diameter of nozzle 18 so that air may flow freely up through passage 100 and through upper opening 99, adjacent to nozzle 18 during the operation of the machine, as described below. By directing air through the passage 100 of nozzle sleeve 90 in this manner, the discharge of air through upper opening 99 adjacent to nozzle 18 may assist in shaping and controlling the shape and characteristics of the spray pattern generated by the nozzle. Alternatively, the upper opening 99 may be sized to tightly receive nozzle 18 so that no air (or minimal air) will pass through nozzle sleeve 90 during the operation of the machine. Nozzle sleeve 90 is secured in position with bottom edge 94 abutting against orifice plate 14.

Once in position around nozzle 18 within product container 12, and during the coating operation, nozzle sleeve 90 serves three functions. First, nozzle sleeve 90 protects tablets 27 from directly impacting the harder surfaces of nozzle 18 during operation, as described below. Second, conical upper portion 96 is shaped to accommodate the natural flow of tablets 27 as they are drawn into the up bed 33 from the down bed 37, as shown in FIG. 3. Third, the hollow passage 100 and the conical upper portion 96 direct air from the lower plenum 16 to assist in shaping the up bed 33 and the coating zone 32.

Nozzle sleeve 90 is preferably made from a strong, somewhat resilient plastic, such as a PTFE or Delrin, or an appropriate rubber, such as silicone, and is preferably adapted to be easily installed within a coating machine and quickly and easily replaced to minimize setup time. The particular dimensions and shape of nozzle sleeve 90 may vary according to particular parameters of the coating machine, as is understood by those skilled in the art. The nozzle sleeve may be separate or integrated into the nozzle ramp, and may be solid or perforated to permit air flow in proximity to the spray nozzle.

3. Nozzle Ramp

As mentioned above, a problem with the conventional Wurster coating machine is that heavier tablets 27 are traumatized during their transition from the down-bed 37 of the product container 12 to the central up-bed 33 through the partition 24. The heavier tablets used in a conventional Wurster machine may also be damaged by impacting the nozzle assembly during bed transition. The up bed 33 moves much faster than the peripheral down bed 37 within the product container and a strong negative pressure is developed around the center of the orifice plate and within part of the partition. As discussed above, this negative pressure rapidly draws tablets 27 from the peripheral down bed 37 radially inwardly along a horizontal path into the airstream of the up bed 33. Owing to the mass of the tablets 27, the horizontal component of the inertia imparted to the tablets 27 by the negative pressure is often too great for the upwardly moving airstream of the up bed 33 to completely vertically redirect the horizontally moving tablets 27 before some of the tablets 27 impact the centrally located nozzle assembly 18, nozzle sleeve 90 (if one is used) and/or other tablets 27 entering from opposing directions along the orifice plate 14.

Referring to FIGS. 4, 6, 11, and 12, a nozzle ramp 102 is shown, according to a second feature of the present invention, which overcomes the above-mentioned problem of tablets 27 impacting nozzle 18 as they enter into the up bed 33. Nozzle ramp 102 includes a circular base 104 having a perimeter 106, a hollow cylindrical center 108 having a side wall 110 and a top edge 112, and an arcuate ramp surface 114 (having a shape that is similar to a cusp) positioned between perimeter 106 of base 104 and top edge 112.

As shown in FIG. 3, nozzle ramp 102 is centrally positioned within product container 12 with its base 104 mounted flush against upper surface 26 of orifice plate 14 (using bolts, for example). Nozzle ramp 102 may be used within the product container with or without a nozzle sleeve. Should a nozzle sleeve be used, hollow center 108 is preferably sized and shaped to accommodate both nozzle 18 and nozzle sleeve 90, described above, or alternatively, a conventionally shaped nozzle sleeve 22, such as the one shown and described in U.S. Pat. No. 5,236,503. Further, nozzle ramp 102 may be formed with an integral nozzle sleeve (not shown), however, it is preferred that nozzle sleeve remain as a separate and attachable part so that tablet and air flow characteristics can be better controlled.

Figure 11:
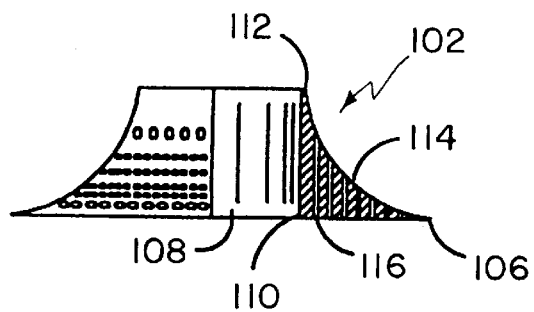
FIG. 11 is a partial-sectional side view of the nozzle-ramp, according to the invention.
Figure 12:
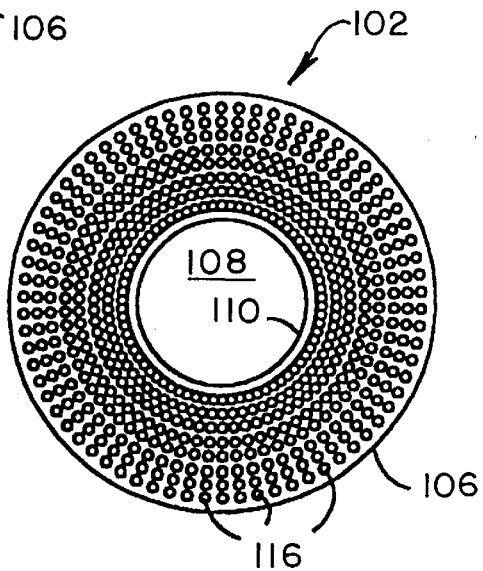
FIG. 12 is a bottom view of the nozzle-ramp showing details of the through passages, according to the invention.
Figure 18:
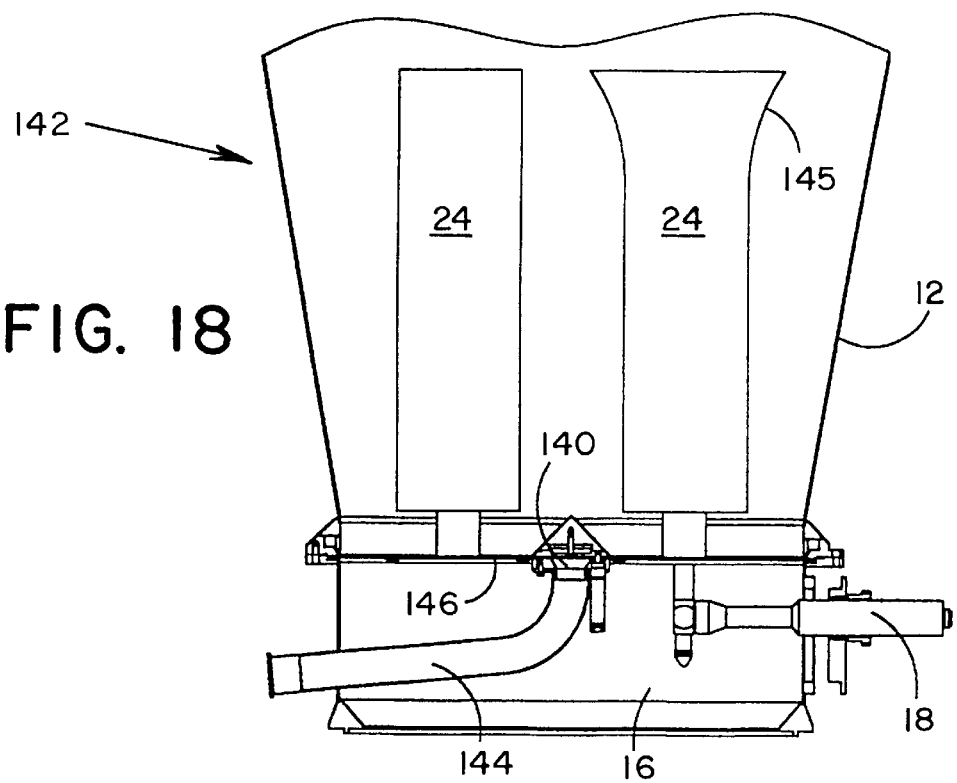
FIG. 18 is a sectional view of a multi-partition coating machine having a central discharge assembly, according to another feature of the present invention, taken along the line 18—18 of FIG. 19.
Figure 19:
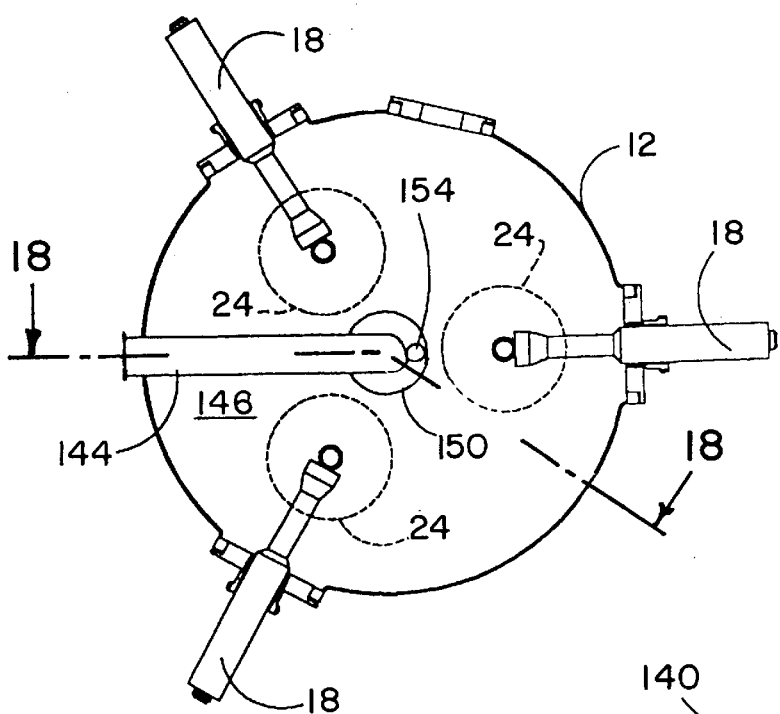
FIG. 19 is a bottom view of the multi-partition coating machine of FIG. 18, according to the invention, showing details of the nozzle assemblies and the central discharge.

Nozzle ramp 102 further includes a plurality of vertically disposed passages 116 which are preferably arranged in concentric rings passing between the arcuate ramp surface 114 and circular base 104, as shown in FIG. 11 (in section). These vertical passages 116 are sized and shaped to exact align with corresponding openings 30 of a conventional orifice plate 14, which is shown in FIGS. 18 and 19, so that air passing through openings 30 from lower plenum 16 freely passes through the aligned vertical passages 116 of nozzle ramp 102 and becomes discharged at an upper end of each respective passage 116 along arcuate ramp surface 114. Passages 116 are preferably either equal to or larger than the corresponding openings 30 of orifice plate 14. Orifice openings 30 are sized to control the flow of air within passages 116.

The purpose of the nozzle ramp 102 is to direct air from the lower plenum 16 along a curved circular ramp surface so that the fast moving, horizontally driven tablets 27 can be atraumatically coerced to follow a vertical trajectory using a cushion of air. As discussed below, the use of nozzle ramp 102 will minimize undesirable impacting of tablets 27 against nozzle 18 or nozzle sleeve 90. The conical upper portion 96 of nozzle sleeve 90, according to the above described feature of the present invention, preferably generally aligns with arcuate ramp surface 114 of nozzle ramp 102, as shown in FIGS. 3 and 4 so that tablets 27 being diverted to the up bed by the nozzle ramp 102 may follow a less severe arcing path (as shown as arrow 118 in FIG. 4) and still avoid impacting any portion of nozzle sleeve 90.

4. Partition Skirt

The tablets 27 located in the down bed 37 (FIG. 1) of a Wurster machine generally move downwardly at a rate of one meter in approximately 10 to 30 seconds. When these tablets 27 are drawn into the up bed 33, where they accelerate to approximately 5 to 10 meters per second, they encounter an atomizing air velocity of about 300 meters per second. This violent change in velocity causes great transitional trauma and high shear to the relatively fragile tablets 27 and will likely increase the attrition rate of the tablets of the batch early in the coating process. The relatively sharp lower edge 25 of the conventional partition 24 which separates the down bed 37 and the up bed 33 only exacerbates the transitional trauma to the tablets 27 as they are drawn into the fast moving upward current of the up bed.

Referring to FIGS. 3, 4, 13, 14, and 15, a partition skirt 120 according to another feature of the present invention is provided at the lower edge 25 of partition 24 which overcomes the problems relating to transitional-trauma of the tablets 27 entering the high velocity up bed 33. Skirt 120 is a ring-shaped cone having a angled outer surface 122 at angle A (FIG. 13), a cylindrical inner bore 124, and a lower surface 126. Bore 124 is sized and shaped to snugly receive partition 24 so that skirt 120 may be secured to the lower end of partition 24 (preferably in a manner that allows skirt 120 to be quickly and easily removed from partition 24 if necessary). The diameter of bore 124 is preferably equal to or slightly larger than the outside diameter of partition 24.

Figure 13:
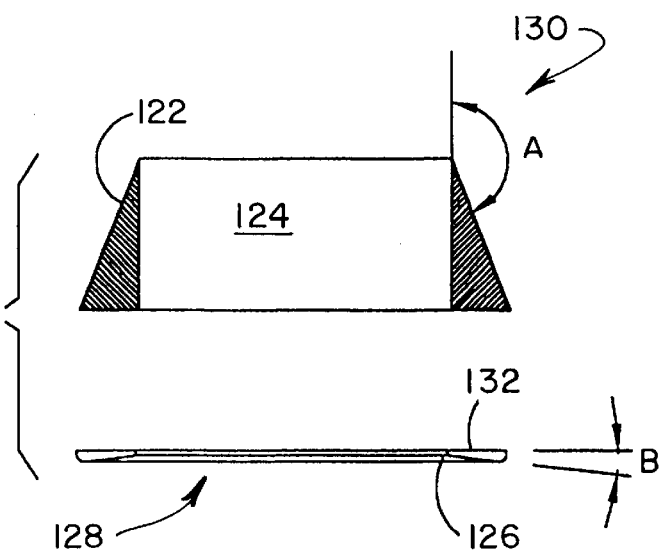
FIG. 13 is a sectional assembly view of the partition skirt showing upper and lower sections, taken along the lines 13—13 of FIG. 14, according to the invention.
Figure 14:
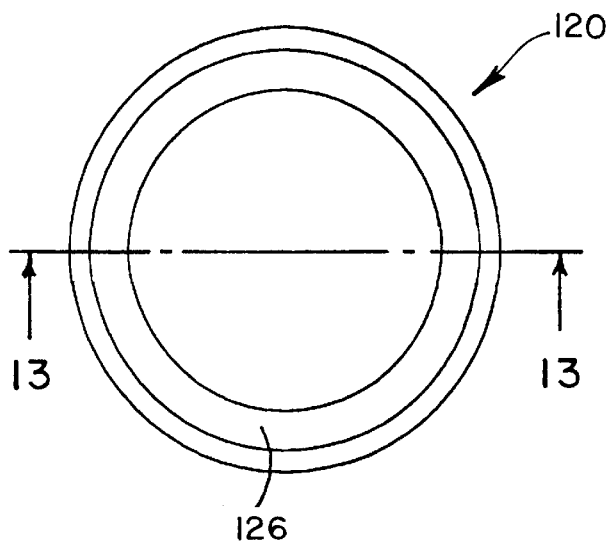
FIG. 14 is a bottom view of the partition skirt, according to the invention.
Figure 15:
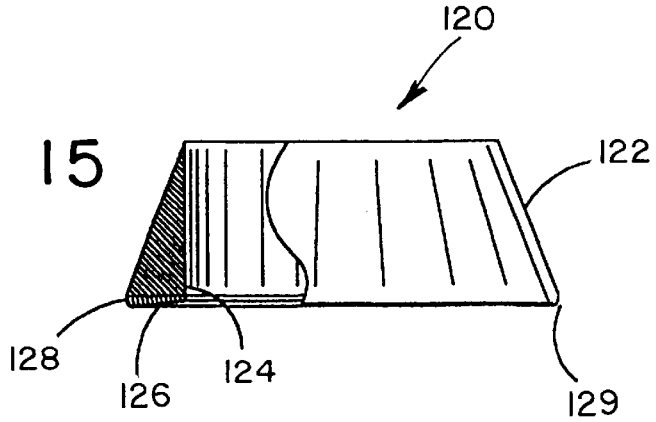
FIG. 15 is a partial-sectional side view of the partition skirt, according to the invention.

Lower surface 126 of skirt 120 is preferably beveled at a prescribed angle B, as shown in FIG. 13, forming an inwardly directed funnel shape which extends between angled surface 122 and bore 124. Lower surface 126 functions as an "on-ramp" allowing tablets 27 adjacent to skirt 120 to "get up to speed" before entering the high velocity up bed 33. The exact degree of angle B of the lower surface 126 will vary depending on the size, shape and weight of the tablets 27, the dimensions of the product container 12, coating characteristics, as well as other structural and operational factors and parameters, but angle B will generally be in the range of 15 and 30 degrees. Lower surface 126 preferably includes a rounded outer edge 129, as shown in FIG. 15.

Tablets 27 located in down bed 37, in particular adjacent to the partition 24, will be directed away from partition 24 as they descend down bed 37 by angled surface 122 until they reach lower surface 126 at which point tablets 27 will gradually pick up speed due to the pressure differential created by the up bed 33 and move inwardly along lower surface 126. As tablets 27 move inwardly along lower surface 126, they will gradually accelerate before "falling upward" into the high velocity up bed 33. Lower surface 126 allows tablets 27 to gain speed and thereby reduces the effects of shear and other mechanical stresses created by the gradient between down bed 37 and up bed 33. This less traumatic introductory path into up bed 33 is represented by the arrow 127 in FIG. 4.

Skirt 120 is preferably made from a strong resilient plastic, such as PTFE or Delrin, but may be made from any appropriate material including other plastics, rubber, and metal, such as stainless steel. To simplify the manufacturing of skirt 120 and to introduce versatility, skirt 120 may be made from two pieces, as shown in FIG. 13 including a lower ramp ring 128 and an upper conical sleeve 130. Ramp ring 128 and conical sleeve 130 may be formed separately (milled or molded) and thereafter secured along a mating surface 132 to each other using any appropriate bonding, fastening or welding technique, as understood by those skilled in the art. In one embodiment, the two pieces making up skirt 120 are attached in an easily removable manner so that one of many conical sleeves 130 having a particular angle A may be fitted with one of many ramp rings 128 having a particular angle B. Although it is preferred that skirt 120 be provided as a part to be attached to the lower portion of partition 24, it is also contemplated that skirt 120 and partition 24 be made integrally as a single piece.

The purpose of skirt 120 is to provide a somewhat horizontal surface (lower surface 126) on which particles 27 may gradually and atraumatically accelerate in the up bed 33. The lower surface 126 is formed between the wall of partition 24 and the angled surface 122, as shown in FIG. 4. Some prior art Wurster machines use a partition that includes an outwardly flared lower end. This flared lower end does not define or otherwise establish an angled surface 122 (or any horizontal surface between the down bed and the up bed). The purpose of the prior art flared lower end is to allow particles to be drawn into the up bed without "crowding" the nozzle and disrupting the spray pattern. Although the flared lower end of the prior art partition forces particles located in the down bed outwardly towards the peripheral wall of the product container, the particles are still traumatically drawn into the up bed because there is no angled (or generally horizontal) surface 122, as in the present invention.

As described above and according to the invention, skirt 120 diverts tablets 27 located in the down bed 37 away from lower edge 25 of partition 24 and provides an inclined ramp (angled lower surface 126) so the adjacent tablets 27 are not harshly and traumatically drawn into the up bed 33. Skirt 120 also helps channel the "loading" of down bed on orifice plate 14 outwardly near the periphery of the product container 12. By doing this, a larger transition zone is created. Tablets 27 located under skirt 120 are more easily suspended by the air flowing through orifice plate 14 from lower plenum 16 because there is less or no downward force exerted on them by tablets 27 located higher in the down bed 37. The result is that tablets 27 move more easily and less traumatically from the down bed 37, through the transition zone, and into the up bed. To maximize this effect, it is preferred that the distance between the outermost point of skirt 120 and the wall of the product container 12 (represented by arrow C in FIG. 4) be approximately equal to the distance between the lowermost point of skirt 120 and the upper surface 26 of orifice plate 14 (represented by arrow D in FIG. 4).

The particular dimensions and shapes of all the above-described components of the improved machine have a mathematical relationship wherein the particular parameters of one component are related and determined by the particular parameters of another component, and the characteristics of the particles being coated, and the desired coating results. Finite analysis techniques may be used to establish the relationship between the components.

5. Central Discharge

A rate limiting factor in the productivity of the Wurster process is the relatively narrow coating zone which, in turn, restricts the diameter of the partition 24 to about nine inches. To increase the efficiency and the productivity of a Wurster machine, the size of the product container may be increased if multiple partitions and nozzles are used. For instance, to operate efficiently, a Wurster machine having an eighteen inch diameter product container uses a nine inch diameter partition. However, a thirty two inch Wurster may require three, nine inch diameter partitions spaced evenly within the product container, and a forty six inch Wurster may include six or seven, nine inch diameter partitions.

Referring to FIGS. 18, 19, 20 and 21, an improved product discharge assembly 140 of the present invention is shown, suitable for efficiently removing tablets 27 (or particles, powders, granules, pellets, or grains) in a sealed and controlled manner from a product container 12 of the type having multiple partitions 24 and nozzles 18. An exemplary coating machine 142 having three nozzles 18 and three partitions 24 is shown and described herein to explain the structure and operation of discharge assembly 140, according to the invention. The discharge assembly 140, according to the invention, may be used with any multi-partition/nozzle Wurster machine or with product containers in conventional fluidized bed drying or spray granulating equipment. The above-described features of the invention including the nozzle ramp, the lower skirt assembly, and the air-discharge manifold are not shown in FIGS. 18 and 19 for clarity. Any and all of the features described in this specification may be used in any combination in a coating or drying machine.

Referring to FIG. 18, partition 24 may include an outwardly flared upper end 145, as shown, having a shape which allows particles 27 to quickly exit up bed 33 (of partition 24) and enter down bed 37 without substantially impacting the side wall of partition 24. The specific shape of the flare is preferably cusp shaped, but flared upper end 145 may alternatively be conical in shape. Flared upper end 145 allows particles 27 to disperse from partition 24 without particle attrition or breakage and encouraging a smooth transition of the particles from the up bed 33 to the down bed 37. Flared upper end 145 may be used in single partition machines, described above, or multi-partition machines, (only one of the partitions 27 of FIGS. 18 and 19 is shown with a flared upper end 145 to illustrate the flared feature). Also, the upper end of partition 27 may include a resilient or impact absorbent material, such as a rubber or suitable plastic to help minimize particle or tablet attrition. The absorbent material (not shown in the figures) may be in the form of a coated layer or an attachable sleeve or layer.

For these larger coating machines, once a coating process is complete for a particular batch of tablets 27, the tablets are typically removed by opening a pivotal lower end of the machine and literally dumping the contents of the product container 12 into an awaiting container (not shown). As described above, this prior art process for removing coated tablets 27 may easily introduce contamination to both the tablets and the interior portions of the machine 10, as well as expose workers to potentially hazardous materials.

Figure 20:
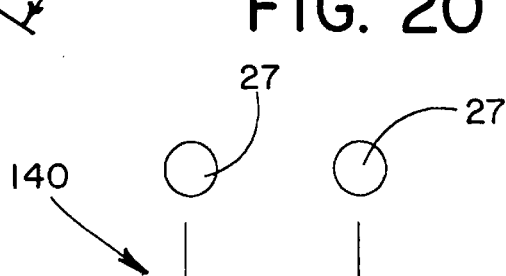
FIG. 20 is an enlarged sectional side view of the central discharge assembly of FIG. 18, according to the invention, shown in a closed position.
Figure 21:
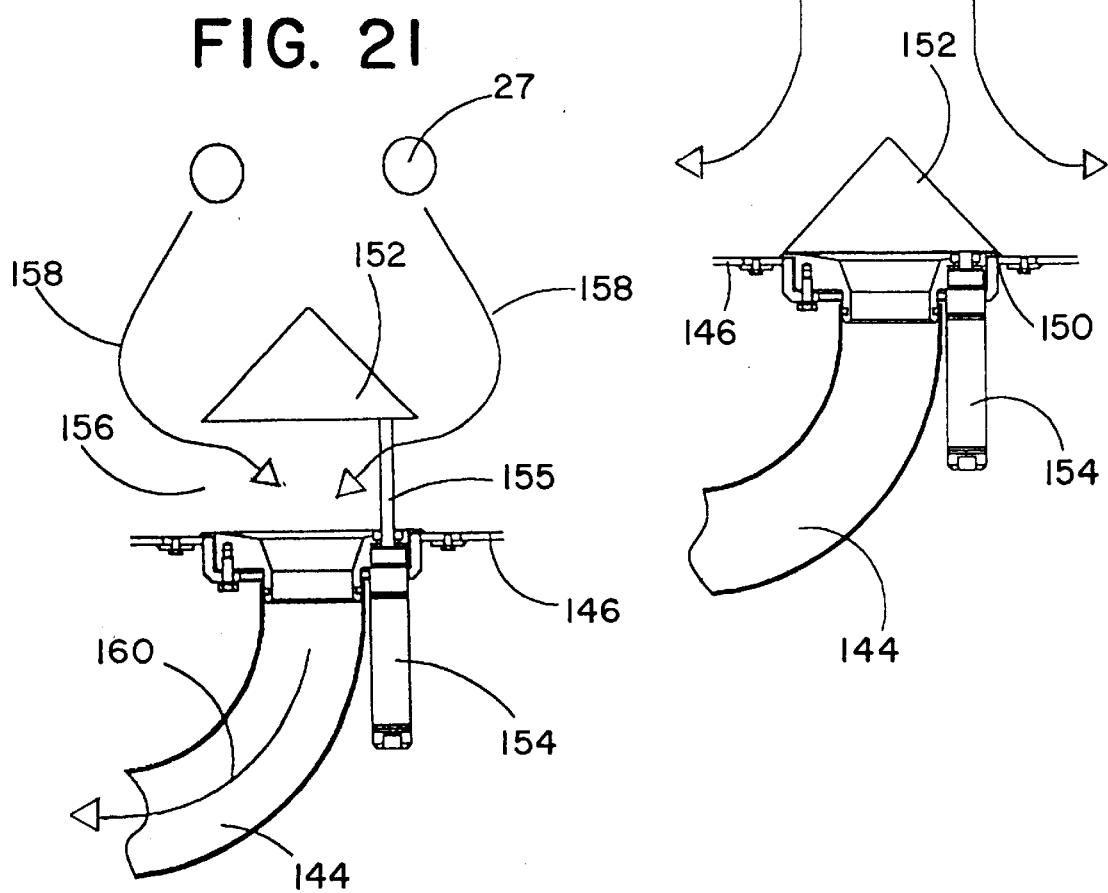
FIG. 21 is the central discharge assembly of FIG. 20, according to the invention, shown in an open position.

The improved machine 142, shown in FIGS. 18 and 19 includes a discharge conduit 144 which extends from an orifice plate 146 to an accessible location remote from the machine 142. Orifice plate 146 is similar to the above-described orifice plate 14, except that it is designed for three nozzles 18 positioned 120° apart from each other and therefore includes three large openings (not shown). According to this feature of the invention and referring to FIGS. 18–21, orifice plate 146 further includes a central discharge opening 150 which is sized and shaped to accommodate discharge conduit 144, as shown in FIGS. 20 and 21. A conical conduit cover 152 is movably fitted above orifice plate 146 in alignment with central discharge opening 150. The conical cover 152 is oriented with its apex directed upward and is movable between two positions, a sealed position (shown in FIG. 20) and an open position (shown in FIG. 21). A linear actuator 154 is connected to conical cover 152 by one or more armatures 155 (only one armature 155 is shown in the figures) so that when activated, actuator 154 linearly displaces armature 155 which, in turn, displaces conical cover 152 between the sealed position (FIG. 20) and the open position (FIG. 21). Actuator 154 may be any appropriate type, such as an electromagnetic actuator (e.g., a solenoid), a pneumatically driven cylinder, an hydraulically driven ram device, or a mechanically operated device such as a system of cables and/or levers (not shown). The purpose of actuator 154 is to open or close conduit cover 152, as desired, and as further discussed below.

When conduit cover 152 is closed, as shown in FIG. 20, tablets 27 remain sealed within product container 12 and, if coating machine 142 is operating, tablets 27 will circulate in a manner similar to the earlier described single partition coating machine 10 (represented by arrows 153 of FIG. 20), without being obstructed or otherwise affected by conduit cover 152. Conical cover 152 will function as a divider, evenly directing the tablets 27 of a central common down bed to each of the three nozzles 18.

When the coating process is complete (or it is otherwise desired to remove tablets 27 from product container 12), actuator 154 is activated causing conduit cover 152 to be vertically displaced above orifice plate 146, as shown in FIG. 21, forming a gap 156 between the perimeter of discharge opening 150 and the perimeter of conduit cover 152. The opening of conical cover 152 exposes an open end of discharge conduit 144 which causes tablets 27 to be drawn into discharge conduit 144, as represented by arrows 158 of FIG. 21, as they continue to circulate within the coating machine 142 between the down bed and the up bed, as described above in connection with earlier features of the invention. Tablets 27 are preferably drawn into discharge conduit 144 using a pressure differential between the product container 12 and the discharge conduit (i.e., by creating a vacuum within discharge conduit 144). The tablets 27 drawn into discharge conduit 144 (represented by arrow 160 of FIG. 21) exit product container 12 and may be collected in an awaiting container (not shown), while remaining in a sealed and controllable environment.

The central discharge assembly described above and shown in FIGS. 18–21, is intended to be used only for larger coating machines which require three or more nozzles 18 and partitions 24. The central discharge assembly is preferably located in the center of the product container 12, but could be located elsewhere along orifice plate 14. The central discharge feature of the invention may be used alone or in combination with any of the other features of this invention and further with any conventional coating machine, or other type of tablet-processing/handling machine including fluidized bed granulating and/or drying machines. The central discharge assembly is preferably used in combination with the above-described compressed air manifold which would assist in forcing product located along the periphery of the product container 12 inwardly towards the central discharge assembly. This assistance to the tablets is particularly useful near the end of the discharge process when few tablets remain in the product container and the fluidization air has been reduced to a minimum or stopped completely. The central discharge system is not limited to use with tablets, but is equally effective with smaller substrates such as pellets, granules, crystals or powders.

6. Cleaning

After a predetermined period of cycle time, the interior surfaces of the multi-partition coating machine 142 described above and shown in FIGS. 18–21 must be cleaned using a cleaning fluid. As described above, it is known to position spray nozzles within the expansion chamber and product container and apply a cleaning fluid along most of the interior wall surfaces, rinsing drug residue (or other materials) and other contaminants down towards the orifice plate 14. However, much of the drug residue includes relatively large particles which are too large to pass through the openings 30 of orifice plate 14 or through a fine screen (not shown), if one is used in combination with the orifice plate 30. These large particles wash down the wall surfaces of the product container and become deposited onto upper surface 26 of the orifice plate 14 or fine screen, typically in the dead zone 40 (see FIG. 2 PRIOR ART), while the waste cleaning fluid passes through the fine screen and the lower plenum 16 as it drains.

In accordance with another feature of the present invention, referring to FIGS. 3, 7 and 18–21, during the cleaning process, cleaning fluid may be injected under high pressure through inlet conduit 64 and inner conduit 62 so that the fluid discharges through openings 60 and across orifice plate 14 (or across a fine screen, not shown, which may be placed on top of orifice plate 14). The radially discharged cleaning fluid will force any of the large particles deposited on orifice plate 14 to also move radially inwardly towards the central discharge assembly. According to the invention, conical cover 152 is moved to its open position (as shown in FIG. 21) during the cleaning process so that the now exposed central discharge conduit 144 may serve as a central drain for any of the larger particles unable to pass through the openings 30 of the orifice plate.

While the use of the compressed air manifold in combination with the central discharge is described for use with a Wurster tablet coating machine, these components may also be installed and used in the same manner for removing powders, granules, and/or coated particles from conventional fluidized bed drying and/or spraying granulating equipment. Also, each of the above-described improvements of this invention may be used alone or in any combination with each other in any type of vertical-spray fluidized bed granulating machines or drying granulating machines, if appropriate.

7. Split Plenum Arrangement

Figure 22:
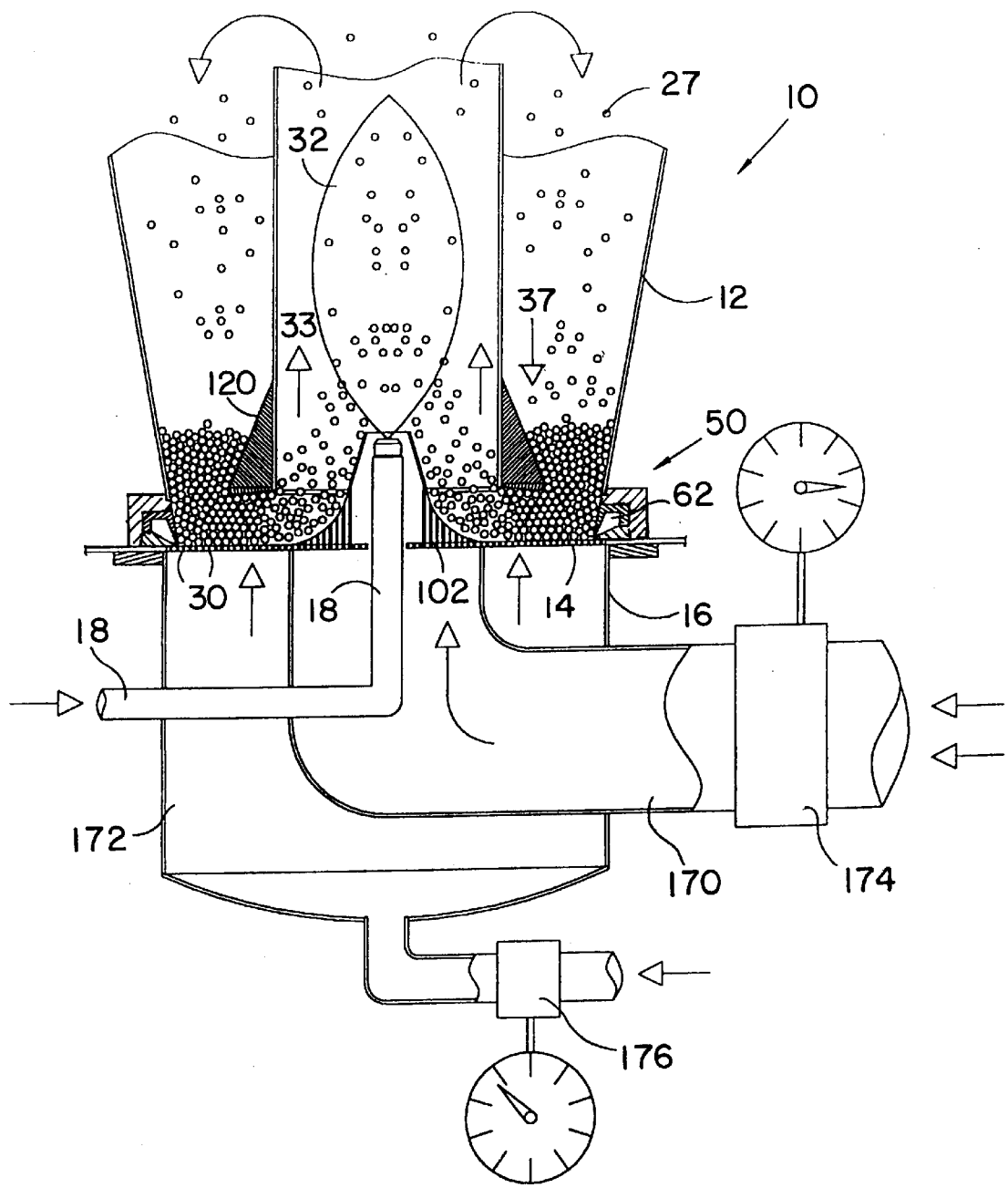
FIG. 22 is a sectional side view schematic of the improved Wurster-type bottom spray particle-coating machine similar to the one shown in FIG. 3, and further including a split lower plenum which divides the air or gas stream and provides independent control of the flow of air or gas in the up and down bed regions of the Wurster machine, according to the present invention.

According to another embodiment of the invention, referring to FIG. 22, a Wuster machine 10 is shown similar to the one shown in FIG. 3 and described above, however the lower plenum 16 now includes a slit-plenum arrangement. The split plenum arrangement includes a central conduit 170 and a peripheral conduit 172. The central conduit 170 extends from the lower surface of orifice plate 14 and is sized and shaped to generally direct air or gas upwardly through nozzle sleeve 90, nozzle ramp 102 (through passages 116) to define the up-bed flow of air in the product container 12. The central conduit 170 is connected to a source of air flow (pressurized gas or appropriate fan) not shown, and further includes a metering system 174 for measuring the speed, pressure, volume, humidity, and/or temperature of the passing central up-bed air flow. The metering system 174 is connected to the source of air flow (not shown) so that an air flow having desired flow characteristics can be achieved and maintained using conventional feedback controlling subsystems, for example.

The peripheral conduit 172 is sized and shaped to supply air flow through the remaining exposed portion (everything around the central conduit) of the orifice plate 14, thereby controlling the fluidized bed characteristics of the down-bed and the transition bed of the product container. Similar to the central conduit 170, the peripheral conduit 172 is connected to a dedicated source of air flow (not shown, and similarly includes a metering system 176 for measuring the speed, pressure, volume, humidity, and/or temperature of the passing peripheral air flow. The metering system 176 may be similar to the central air-flow metering system 174 and may similarly be used as a feedback controlling system to maintain air-flow having desired preset characteristics.

By separating the flow through the lower plenum 16 into central and peripheral regions, up-bed, down-bed, and transitional-bed flow and fluidization characteristics may be more accurately and independently controlled.

What is claimed is:

1. An improved Wurster-type fluidized bed apparatus for applying a coating liquid onto the surface of particles, said apparatus being of the type including a vertically disposed generally cylindrical product container having a peripheral wall, at least one cylindrical partition defining a centrally located up-bed region and a peripherally located down-bed region, said product container further including an upper end connected to an expansion chamber, a lower end including an orifice plate having a plurality of openings for passage of fluidized air, a nozzle centrally located through said orifice plate and being adapted to generate a spray of said coating liquid upwardly into said up-bed, wherein said particles located within said product container circulate upwardly through said partition and said spray of coating liquid, between said up-bed and said down-bed, said improvement comprising:

a plurality of inwardly directed discharge jets positioned along the periphery of said cylindrical product container and generally adjacent to said orifice plate; and a source of pressurized gas connected to said plurality of discharge jets for selectively providing a radially inwardly directed flow of gas through said particles of said down-bed so that said particles located adjacent to said peripheral wall of said product container are displaced radially inwardly along said orifice plate towards said nozzle and said up-bed.

2. The improved Wurster-type fluidized bed apparatus, according to claim 1, further comprising a manifold positioned adjacent to said peripheral wall of said product container, said manifold providing fluid communication between said source of pressurized gas and at least two of said discharge jets.

3. The improved Wurster-type fluidized bed apparatus, according to claim 1, wherein said discharge jets are evenly spaced about the peripheral wall of said product container.

4. The improved Wurster-type fluidized bed apparatus, according to claim 1, wherein said discharge jets comprise a single annular discharge slot positioned around said peripheral wall of said product container and generally adjacent and parallel to said orifice plate.

5. The improved Wurster-type fluidized bed apparatus, according to claim 2, wherein said manifold includes a circular conduit ring which defines a circular gas conduit, and a circular bottom sealing ring, said discharge jets being formed between said bottom sealing ring and said conduit ring, said discharge jets being formed in fluid communication with said gas conduit.

6. The improved Wurster-type fluidized bed apparatus, according to claim 1, wherein said gas discharged through said discharge jets is air.

7. The improved Wurster-type fluidized bed apparatus, according to claim 1, wherein said gas discharged through said discharge jets is an inert gas.

8. The improved Wurster-type fluidized bed apparatus, according to claim 7, wherein said inert gas discharged through said discharge jets is nitrogen.

9. An improved Wurster-type fluidized bed apparatus according to claim 1, further comprising a partition having an outer wall surface and an outwardly directed flared lower end defining a lower rim, and a transition surface extending between said lower rim and said up-bed, so that particles located within said down-bed adjacent to said outer wall surface are urged outwardly away from said up-bed until reaching said lower rim, at which point, said particles are atraumatically and gradually directed inwardly along said transition surface into said up-bed.

10. An improved Wurster-type fluidized bed apparatus according to claim 9, wherein said outwardly directed flared lower end ramp surface is spaced from said peripheral wall of said product container a first distance, and said ramp surface is positioned a second distance above said orifice plate, said first distance being generally equal to said second distance.

11. An improved Wurster-type fluidized bed apparatus according to claim 9, wherein said outwardly directed flared lower end ramp surface is spaced from said peripheral wall of said product container a first distance, and said ramp surface is positioned a second distance above said orifice plate, said first distance being greater than said second distance.

12. An improved Wurster-type fluidized bed apparatus according to claim 9, wherein said outwardly directed flared lower end ramp surface is spaced from said peripheral wall of said product container a first distance, and said ramp surface is positioned a second distance above said orifice plate, said first distance being less than said second distance.

13. An improved Wurster-type fluidized bed apparatus according to claim 9, further comprising a generally cusp shaped ramp surface centrally positioned around said nozzle and directed upwardly towards said partition, said cusp shaped ramp surface being shaped to direct particles moving generally horizontally across said orifice plate from said down-bed upwardly into said partition and said up-bed.

14. An improved Wurster-type fluidized bed apparatus according to claim 13, further comprising a discharge opening located within said orifice plate, said discharge opening including a conduit positioned below said orifice plate, said discharge opening and said conduit being sized and shaped to selectively discharge material from said product container; and at least one discharge jet positioned within said product container, said at least one discharge jet connected to a source of fluid and being positioned so that said fluid discharged by said at least one discharge jet is directed towards said discharge opening to urge said material located between said at least one discharge jet and said discharge opening towards said discharge opening.

15. An improved Wurster-type fluidized bed apparatus according to claim 14, further comprising a central first plenum located below said orifice plate and being aligned with said up-bed and said partition, said first plenum being sized and shaped to direct gas upwardly through said orifice plate and into said up-bed;

a second plenum located below said orifice plate positioned around said first plenum for directing gas upwardly through said orifice plate and into contact with particles located on said orifice plate;

a first source of gas connected to said first plenum; and a second source of gas connected to said second plenum.

16. An improved Wurster-type fluidized bed apparatus according to claim 1, further comprising a generally cusp shaped ramp surface centrally positioned around said nozzle and directed upwardly towards said partition, said cusp shaped ramp surface being shaped to direct particles moving generally horizontally across said orifice plate from said down-bed upwardly into said partition and said up-bed.

17. An improved Wurster-type fluidized bed apparatus according to claim 16, further comprising a plurality of vertically directed air passages which align with said openings of said orifice plate so that a portion of said fluidized flow of air passes through said air passages and creates a cushion of air along said cusp shaped ramp surface, said cushion of air directing particles upwardly from said down bed and preventing impact with said nozzle.

18. An improved Wurster-type fluidized bed apparatus according to claim 16, further comprising a discharge opening located within said orifice plate, said discharge opening including a conduit positioned below said orifice plate, said discharge opening and said conduit being sized and shaped to selectively discharge material from said product container; and at least one discharge jet positioned within said product container, said at least one discharge jet connected to a source of fluid and being positioned so that said fluid discharged by said at least one discharge jet is directed towards said discharge opening to urge said material located between said at least one discharge jet and said discharge opening towards said discharge opening.

19. An improved Wurster-type fluidized bed apparatus according to claim 18, further comprising a central first plenum located below said orifice plate and being aligned with said up-bed and said partition, said first plenum being sized and shaped to direct gas upwardly through said orifice plate and into said up-bed;

a second plenum located below said orifice plate positioned around said first plenum for directing gas upwardly through said orifice plate and into contact with particles located on said orifice plate;

a first source of gas connected to said first plenum; and a second source of gas connected to said second plenum.

20. An improved Wurster-type fluidized bed apparatus according to claim 1, further comprising a discharge opening located within said orifice plate, said discharge opening including a conduit positioned below said orifice plate, said discharge opening and said conduit being sized and shaped to selectively discharge material from said product container; and at least one discharge jet positioned within said product container, said at least one discharge jet connected to a source of fluid and being positioned so that said fluid discharged by said at least one discharge jet is directed towards said discharge opening to urge said material located between said at least one discharge jet and said discharge opening towards said discharge opening.

21. An improved Wurster-type fluidized bed apparatus according to claim 20, wherein said discharge opening includes a displaceable cover, said cover being moveable between a closed and open position.

22. An improved Wurster-type fluidized bed apparatus according to claim 20, wherein said fluid is a cleaning liquid and said material is waste material located on said orifice plate within said product container.

23. An improved Wurster-type fluidized bed apparatus according to claim 20, wherein said material is cleaning fluid located within said product container during a cleaning process.

24. An improved Wurster-type fluidized bed apparatus according to claim 20, further comprising a central first plenum located below said orifice plate and being aligned with said up-bed and said partition, said first plenum being sized and shaped to direct gas upwardly through said orifice plate and into said up-bed;

a second plenum located below said orifice plate positioned around said first plenum for directing gas upwardly through said orifice plate and into contact with particles located on said orifice plate;

a first source of gas connected to said first plenum; and a second source of gas connected to said second plenum.

25. An improved Wurster-type fluidized bed apparatus according to claim 1, further comprising a central first plenum located below said orifice plate and being aligned with said up-bed and said partition, said first plenum being sized and shaped to direct gas upwardly through said orifice plate and into said up-bed;

a second plenum located below said orifice plate positioned around said first plenum for directing gas upwardly through said orifice plate and into contact with particles located on said orifice plate;

a first source of gas connected to said first plenum; and a second source of gas connected to said second plenum.

26. An improved Wurster-type fluidized bed apparatus according to claim 25, further comprising a flow control device positioned to control the relative flow of gas through said first and second plenums.

27. An improved Wurster-type fluidized bed apparatus according to claim 25, further comprising a flow measuring device positioned to independently measure the flow of gas within said first and second plenums.

28. An improved Wurster-type fluidized bed apparatus according to claim 25, further comprising a pressure measuring device in communication with said first and second plenums, said pressure measuring device used to measure the pressure difference between said first and second plenums.

* * * * *